(12) United States Patent
Kennedy et al.

(10) Patent No.: US 10,926,945 B2
(45) Date of Patent: Feb. 23, 2021

(54) DISPENSING APPARATUS AND METHOD

(71) Applicant: NE Innovations Limited, Altrincham (GB)

(72) Inventors: Brian George Kennedy, Cheshire (GB); Edward Alexander Bedford, Farmingville, NY (US); John R Laverack, Southbury, CT (US); George Edward Riehm, New Fairfield, CT (US); Kurt Raymond Weseman, West Haven, CT (US); Bruce Renfrew, Leicester (GB); James Williamson, Leicester (GB)

(73) Assignee: NE Innovations Limited, Altrincham (GB)

( * ) Notice: Subject to any disclaimer, the term of this patent is extended or adjusted under 35 U.S.C. 154(b) by 28 days.

(21) Appl. No.: 16/256,950

(22) Filed: Jan. 24, 2019

(65) Prior Publication Data

US 2019/0231115 A1    Aug. 1, 2019

Related U.S. Application Data

(60) Provisional application No. 62/622,225, filed on Jan. 26, 2018.

(30) Foreign Application Priority Data

Nov. 2, 2018  (GB) ........................................ 1817946
Nov. 2, 2018  (GB) ........................................ 1817948

(51) Int. Cl.
*A47J 31/40*    (2006.01)
*A47J 31/36*    (2006.01)
(Continued)

(52) U.S. Cl.
CPC ...... *B65D 85/8043* (2013.01); *A47J 31/0642* (2013.01); *A47J 31/0673* (2013.01);
(Continued)

(58) Field of Classification Search
CPC .. B01D 35/14; B01D 2201/48; B67D 1/0046; B67D 1/0869; B65D 85/8046;
(Continued)

(56) References Cited

U.S. PATENT DOCUMENTS 3,101,870 A * 8/1963 Betner ............... B65D 77/2028
                                                                 222/153.07
3,295,998 A * 1/1967 Goros ................. A47J 31/3638
                                                                 99/282
(Continued)

FOREIGN PATENT DOCUMENTS

WO    2008148601 A1    12/2008
WO    2011095518 A3    8/2011
(Continued)

OTHER PUBLICATIONS

International Search Report for Application No. PCT/GB2019/050194 dated Mar. 15, 2019 (10 pages).
(Continued)

*Primary Examiner* — Eric S Stapleton
(74) *Attorney, Agent, or Firm* — Michael Best & Friedrich LLP

(57) ABSTRACT

A dispensing apparatus for dispensing a beverage preparation ingredient from a pod. The dispensing apparatus comprises a pod support region configured to support a pod, an actuator configured to engage with a corresponding actuator engagement region of the pod, and a rotation mechanism for rotating the pod. The apparatus is configured to cause the actuation member to cause an opening to be formed in a pod supported by the pod support region. The apparatus is
(Continued)

further configured to cause the rotation mechanism to cause the pod to rotate about an axis of rotation during a dispensing operation, so as to cause the beverage preparation ingredient to be released from the pod via said opening.

19 Claims, 26 Drawing Sheets

(51) Int. Cl.
  *B65D 85/804*    (2006.01)
  *A47J 31/06*     (2006.01)
  *C02F 1/00*      (2006.01)
  *B67D 1/08*      (2006.01)
  *B67D 1/00*      (2006.01)
  *A47J 31/22*     (2006.01)
  *A47J 31/46*     (2006.01)
  *A47J 31/60*     (2006.01)
  *B01D 35/14*     (2006.01)
  *C02F 103/02*    (2006.01)
  *A47J 31/44*     (2006.01)

(52) U.S. Cl.
  CPC ........... *A47J 31/22* (2013.01); *A47J 31/3685* (2013.01); *A47J 31/404* (2013.01); *A47J 31/407* (2013.01); *A47J 31/465* (2013.01); *A47J 31/605* (2013.01); *B01D 35/14* (2013.01); *B65D 85/8046* (2013.01); *B67D 1/0046* (2013.01); *B67D 1/0869* (2013.01); *C02F 1/001* (2013.01); *C02F 1/003* (2013.01); *A47J 31/4403* (2013.01); *B01D 2201/48* (2013.01); *C02F 2103/02* (2013.01); *C02F 2301/043* (2013.01); *C02F 2301/046* (2013.01); *C02F 2307/00* (2013.01); *C02F 2307/10* (2013.01)

(58) Field of Classification Search
  CPC ........... B65D 85/8043; C02F 2301/046; C02F 2307/00; C02F 2103/02; C02F 2307/10; C02F 2301/043; C02F 1/001; C02F 1/003; A47J 31/4403; A47J 31/605; A47J 31/407; A47J 31/0673; A47J 31/22; A47J 31/3685; A47J 31/465; A47J 31/0642; A47J 31/404
  USPC .......................................................... 99/295
  See application file for complete search history.

(56) References Cited

U.S. PATENT DOCUMENTS

| | | | | |
|---|---|---|---|---|
| 3,743,520 A * | 7/1973 | Croner | ............... | B65D 81/3216 426/87 |
| 4,091,930 A * | 5/1978 | Buchner | ............ | B65D 77/2052 206/469 |
| 4,437,499 A * | 3/1984 | Devale | .................. | B67D 1/1236 141/198 |
| 4,492,295 A * | 1/1985 | DeWoolfson | ......... | G07F 7/0609 100/902 |
| 4,863,036 A * | 9/1989 | Heijenga | ............ | B65D 77/2052 229/123.1 |
| 5,156,329 A * | 10/1992 | Farrell | ................ | B29C 65/8246 220/359.3 |
| 5,316,603 A * | 5/1994 | Akazawa | ................ | B29C 65/08 156/69 |
| 5,393,032 A * | 2/1995 | Cederroth | ............ | B65D 75/327 156/711 |
| 5,433,374 A * | 7/1995 | Forbes, Jr. | ........... | B65D 5/2047 229/120 |
| 5,613,617 A * | 3/1997 | Da Vitoria Lobo | ........................ | B65D 77/2032 215/232 |
| 5,906,845 A * | 5/1999 | Robertson | ............ | B65D 85/804 426/112 |
| 6,085,942 A * | 7/2000 | Redmond | ............... | B29C 51/08 222/107 |
| 6,145,705 A * | 11/2000 | Wallace | .................. | A47G 19/34 222/160 |
| 6,554,165 B2 * | 4/2003 | Cote | ..................... | B65D 1/0276 222/129.1 |
| 6,886,690 B2 * | 5/2005 | Petricca | ............... | A45D 27/225 206/356 |
| 6,945,157 B2 * | 9/2005 | Brown | ..................... | A23G 9/04 222/129.1 |
| 7,032,507 B2 * | 4/2006 | Cai | ..................... | A47J 27/2105 99/317 |
| 7,051,646 B2 * | 5/2006 | Della Pietra | ........ | A47J 31/3633 99/280 |
| 8,431,175 B2 * | 4/2013 | Yoakim | ................... | A47J 31/22 426/431 |
| 8,920,858 B2 * | 12/2014 | Yauk | ................... | B65D 75/5866 426/115 |
| 8,978,542 B2 * | 3/2015 | Talon | ................... | A47J 31/462 99/289 R |
| 8,985,561 B2 * | 3/2015 | Hatherell | ............ | B01F 3/04794 261/119.1 |
| 9,095,236 B2 * | 8/2015 | Perentes | ............. | A47J 31/3695 |
| 9,168,493 B1 * | 10/2015 | Lee | ........................ | B01D 61/16 |
| 9,198,455 B2 * | 12/2015 | Hatherell | ............. | B67D 1/0057 |
| 9,271,598 B2 * | 3/2016 | Yoakim | ................ | B65D 85/8043 |
| 10,485,374 B2 * | 11/2019 | Lo Faro | ............. | A47J 31/4492 |
| 2001/0012448 A1 * | 8/2001 | Roberson | ................ | A47J 31/56 392/442 |
| 2002/0124736 A1 * | 9/2002 | Kollep | ................. | A47J 31/0668 99/289 R |
| 2004/0228955 A1 | 11/2004 | Denisart et al. | | |
| 2006/0000851 A1 * | 1/2006 | Girard | .................. | B67D 1/0022 222/129.1 |
| 2007/0131687 A1 * | 6/2007 | Otto | ...................... | A47G 33/002 220/212 |
| 2007/0164045 A1 * | 7/2007 | Wydler | ............... | B65D 77/2052 222/106 |
| 2007/0175334 A1 * | 8/2007 | Halliday | ............. | A47J 31/4492 99/279 |
| 2007/0227456 A1 * | 10/2007 | Borey | ................... | A01K 5/0114 119/61.52 |
| 2008/0148948 A1 * | 6/2008 | Evers | ..................... | B65B 69/005 99/275 |
| 2008/0190374 A1 * | 8/2008 | Farris | .................... | A01K 7/027 119/74 |
| 2008/0190937 A1 * | 8/2008 | Cho | ................... | G01N 33/57484 220/573.1 |
| 2008/0223741 A1 * | 9/2008 | Nyambi | ............. | B65D 51/2835 206/222 |
| 2008/0277326 A1 * | 11/2008 | Hersey | ................... | B01D 29/15 210/170.03 |
| 2009/0155422 A1 * | 6/2009 | Ozanne | ............... | A47J 31/3628 426/89 |
| 2009/0194105 A1 * | 8/2009 | Besseler | ........... | A61M 15/0051 128/203.15 |
| 2009/0223375 A1 * | 9/2009 | Verbeek | ................ | B67D 1/0045 99/287 |
| 2009/0241782 A1 * | 10/2009 | Van Dillen | .............. | A47J 31/44 99/279 |
| 2010/0047418 A1 * | 2/2010 | Bongers | ............. | B65D 85/8043 426/431 |
| 2010/0154644 A1 * | 6/2010 | Skalski | .................. | A47J 31/369 99/275 |
| 2010/0154649 A1 * | 6/2010 | Skalski | ................. | A47J 31/4403 99/295 |
| 2010/0159078 A1 * | 6/2010 | Skalski | .................. | A47J 31/369 426/80 |
| 2010/0162898 A1 * | 7/2010 | Mahlich | ................ | A47J 31/401 99/290 |

(56) References Cited

U.S. PATENT DOCUMENTS

| | | | | |
|---|---|---|---|---|
| 2010/0162901 A1* | 7/2010 | Mahlich | A47J 31/407 | 99/323.1 |
| 2010/0173056 A1* | 7/2010 | Yoakim | A47J 31/22 | 426/433 |
| 2010/0180775 A1* | 7/2010 | Kollep | B65D 85/8043 | 99/295 |
| 2012/0231126 A1* | 9/2012 | Lo Faro | A23F 5/262 | 426/115 |
| 2012/0298258 A1* | 11/2012 | Rithener | A47J 31/00 | 141/285 |
| 2013/0071532 A1* | 3/2013 | Pribus | A47J 31/407 | 426/431 |
| 2013/0105340 A1* | 5/2013 | Hother | B65D 85/8043 | 206/222 |
| 2013/0189400 A1* | 7/2013 | Pribus | A47J 31/407 | 426/115 |
| 2013/0236609 A1* | 9/2013 | Magniet | A47J 31/0642 | 426/87 |
| 2013/0239820 A1* | 9/2013 | Baldo | A47J 31/407 | 99/295 |
| 2013/0312619 A1* | 11/2013 | Spiegel | A47J 31/3623 | 99/295 |
| 2014/0141141 A1* | 5/2014 | Giannelli | A23L 2/39 | 426/431 |
| 2014/0352547 A1* | 12/2014 | Leuzinger | A47J 31/407 | 99/295 |
| 2015/0017288 A1* | 1/2015 | Lo Faro | A47J 31/407 | 426/112 |
| 2015/0050394 A1* | 2/2015 | Wong | A47J 31/3685 | 426/115 |
| 2015/0060481 A1* | 3/2015 | Murray | B65D 83/06 | 222/1 |
| 2015/0060482 A1* | 3/2015 | Murray | A47J 31/407 | 222/1 |
| 2015/0079240 A1* | 3/2015 | Lo Foro | B65D 85/8043 | 426/115 |
| 2015/0129473 A1* | 5/2015 | Kent | E03F 5/14 | 210/170.03 |
| 2015/0135965 A1* | 5/2015 | Lo Foro | A47J 31/3633 | 99/285 |
| 2015/0144001 A1* | 5/2015 | Lo Foro | A23L 2/39 | 99/283 |
| 2016/0106136 A1* | 4/2016 | Gordon | A47J 31/407 | 426/477 |
| 2016/0106255 A1* | 4/2016 | Gordon | A47J 31/407 | 426/590 |
| 2016/0106256 A1* | 4/2016 | Gordon | A47J 31/46 | 99/295 |
| 2016/0107876 A1* | 4/2016 | Mackey | F28F 1/14 | 62/3.3 |
| 2016/0109165 A1* | 4/2016 | Mackey | A47J 31/469 | 426/524 |
| 2016/0109175 A1* | 4/2016 | Mackey | F28F 1/14 | 62/3.64 |
| 2016/0152408 A1* | 6/2016 | Fuchs | B65D 85/8043 | 426/115 |
| 2016/0192806 A1* | 7/2016 | Pikkemaat | A47J 31/42 | 426/115 |
| 2016/0244248 A1* | 8/2016 | Corker | A47J 31/407 | |
| 2016/0255990 A1* | 9/2016 | Bartoli | A47J 31/3628 | |
| 2016/0280454 A1* | 9/2016 | Mills | B65D 25/04 | |
| 2017/0127874 A1* | 5/2017 | Rivera | A47J 31/3685 | |
| 2018/0289204 A1* | 10/2018 | Lo Faro | B65D 79/00 | |
| 2019/0231115 A1* | 8/2019 | Kennedy | A47J 31/22 | |
| 2019/0233201 A1* | 8/2019 | Kennedy | B65D 85/8046 | |

FOREIGN PATENT DOCUMENTS

| | | |
|---|---|---|
| WO | 2014082940 A1 | 6/2014 |
| WO | 2014102701 A1 | 7/2014 |
| WO | 2015056022 A1 | 4/2015 |
| WO | 2017068535 A1 | 4/2017 |
| WO | 2017068565 A1 | 4/2017 |
| WO | 2017200382 A1 | 11/2017 |

OTHER PUBLICATIONS

International Search Report for Application No. PCT/GB2019/050196 dated Mar. 18, 2019 (13 pages).
United Kingdom Intellectual Property Office for Application No. GB1817946.5 dated Dec. 21, 2018 (3 pages).
United Kingdom Intellectual Property Office for Application No. GB1817948.1 dated Dec. 13, 2018 (4 pages).
United States Patent Office Action for U.S. Appl. No. 16/256,943 dated Sep. 19, 2019 (12 pages).
United States Patent Office Action for U.S. Appl. No. 16/256,943 dated May 15, 2020 (12 pages).

* cited by examiner

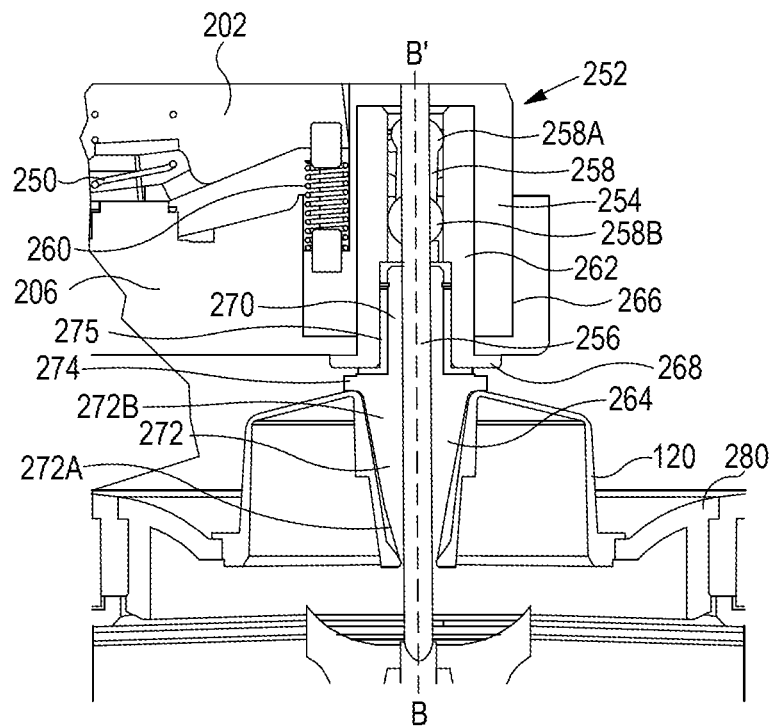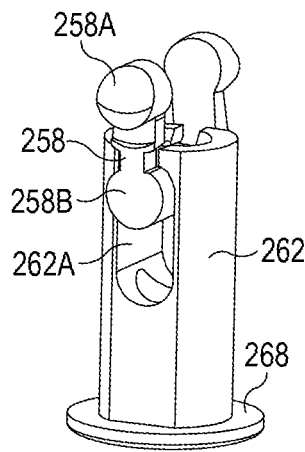
Fig. 7a
Fig. 7b
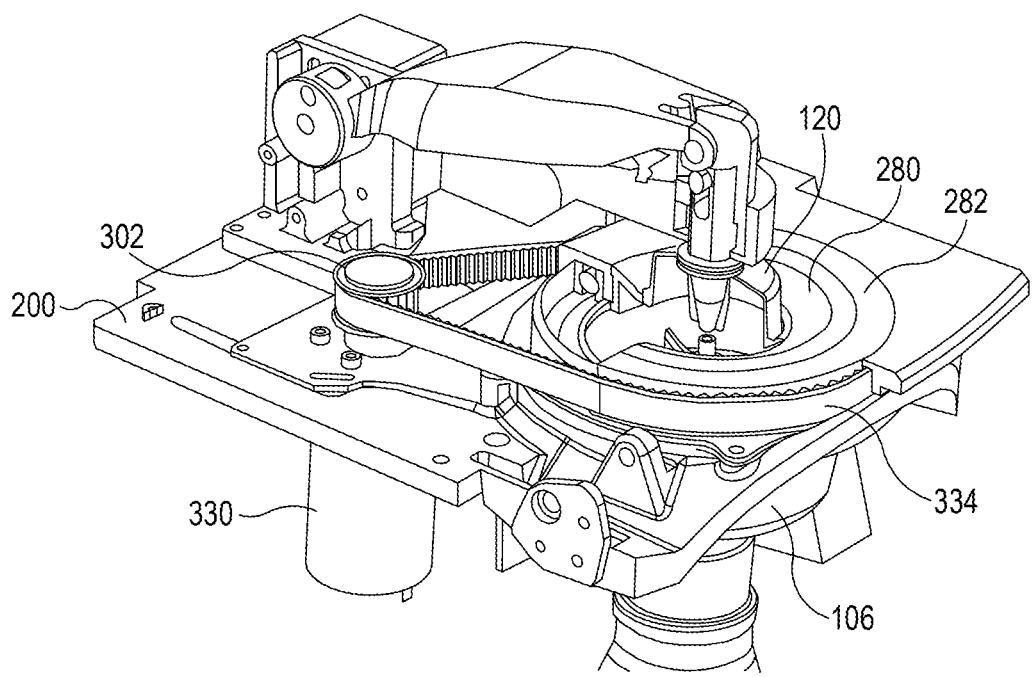
Fig. 8

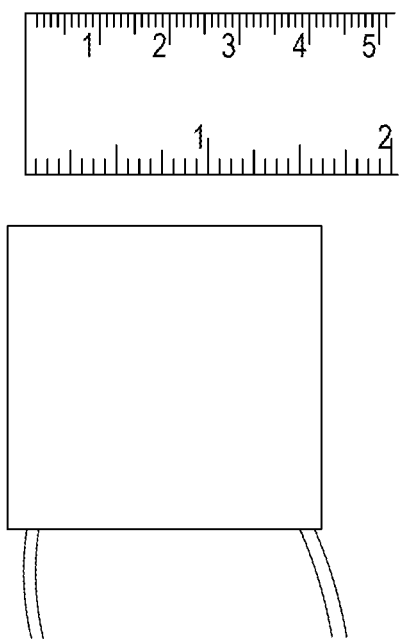
Fig. 17
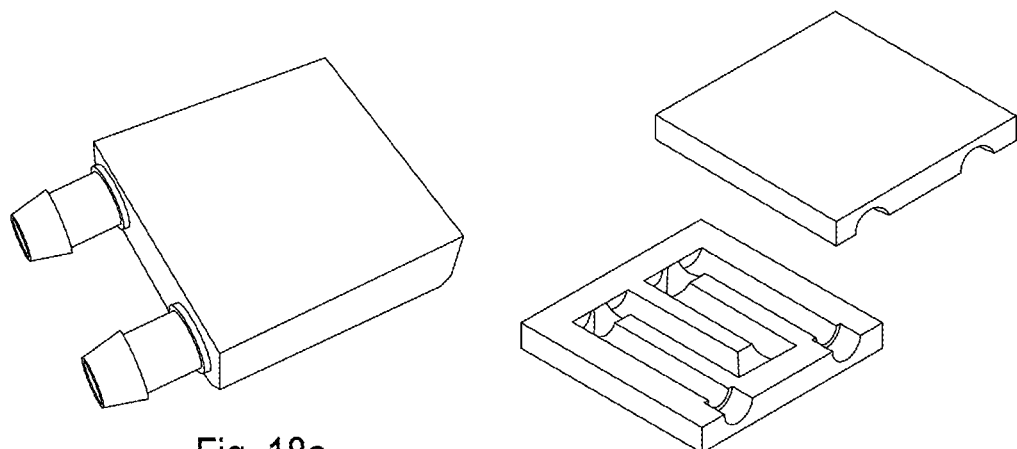
Fig. 18a
Fig. 18b

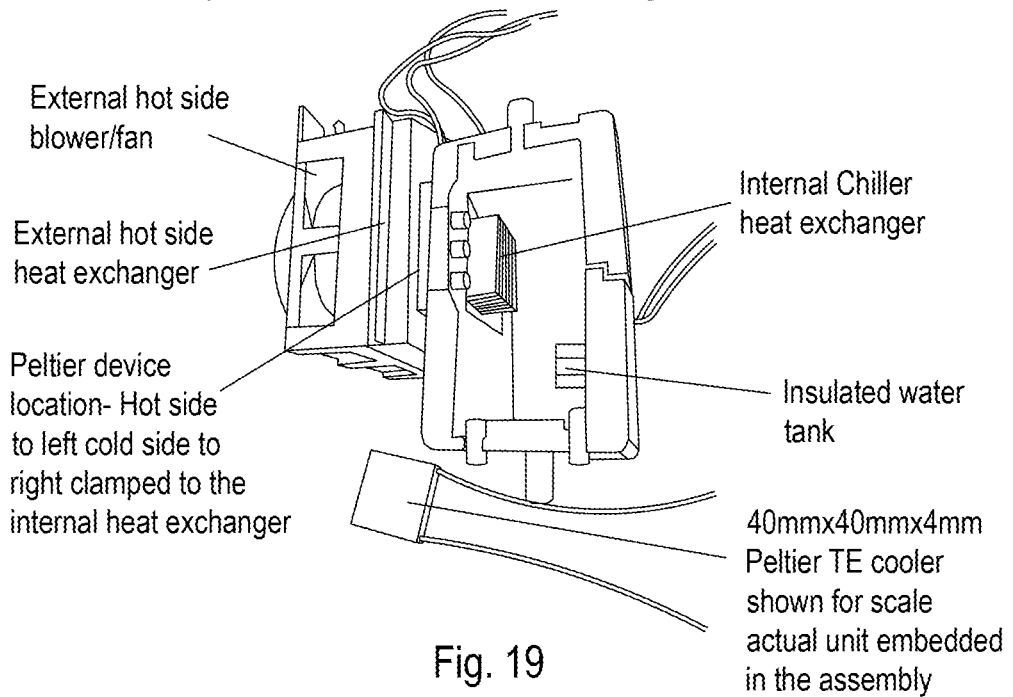
Fig. 19 — cutaway view of a standard Chiller tank using a Peltier TE cooler
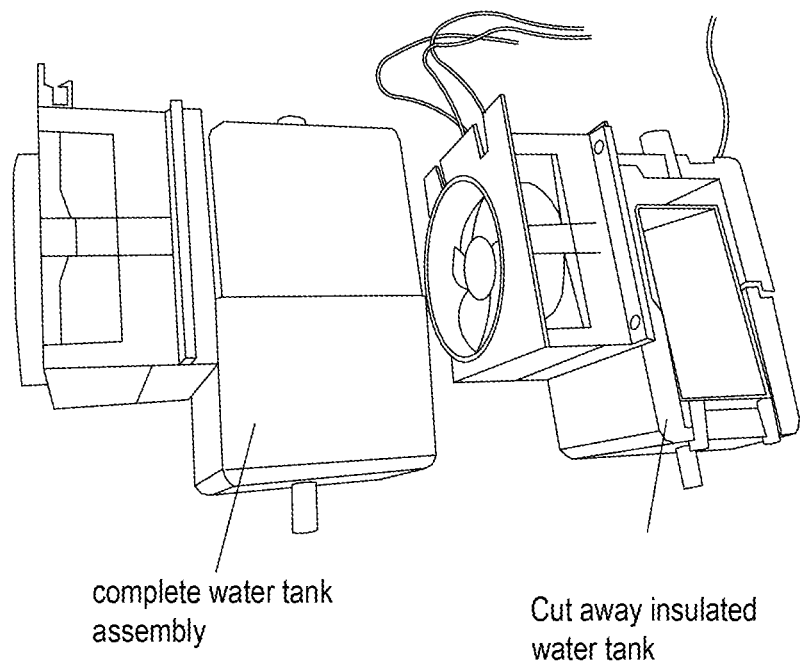
Fig. 20 — Cutaway and complete standard Chiller tanks using a Peltier TE cooler Mix and Dispense Process
11/22/17

- Pod placed in "brew head" of dispenser.

Mix and Dispense Process

- Lid is closed, using bail type handle.
- Water nozzle passes thorugh centre hole of pod.
- Motorized rotation of both pod and mixing chamber begins.
- Water enters through chamber through the nozzle and adheres to the walls of the mixing chamber via centrifugal force.

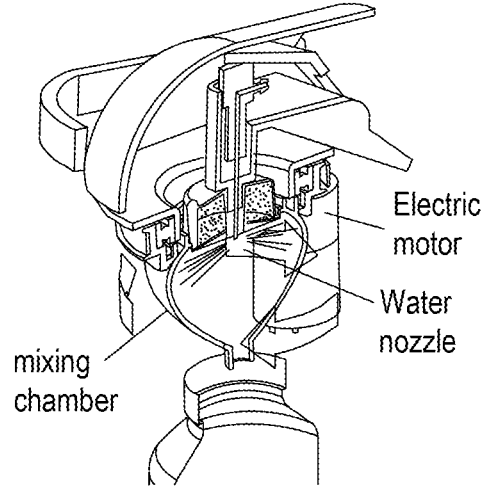

Fig. 29

Mix and Dispense Process

- Lid is closed further to a hard stop.
- Further closure of the lid releases a spring force
in the nozzle assembly that creates sudden downward force on the centre of the cup portion of the pod.
- The force applied by the nozzle assembly flexes the lateral pod surfaces, causing the centre shaft of the pod to be driven downward, thereby driving downward the plunger, which will break film seal on the outer rim of the pod.
- Powdered contents are then released into the mixing chamber.
- Continued rotation of the pod and mixing chamber cause the powder to collect along the vertical inner walls of the chamber.

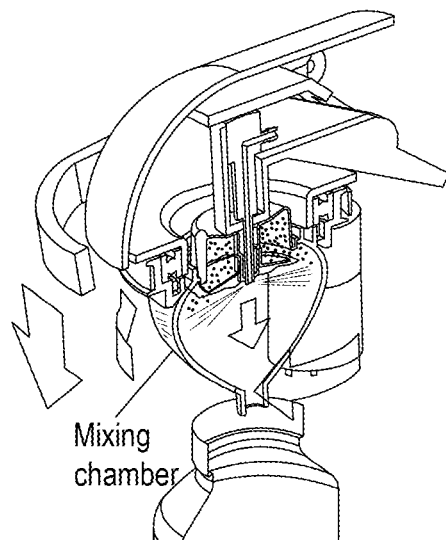

Fig. 30

Mix and Dispense Process

- Continued rotation of the pod and mixing chamber cause the powder to collect along the vertical inner walls of the chamber.
- Water spray is stopped.

Mix and Dispense Process

- Continued rotation sends powder material into suspension.

Mix and Dispense Process

- Rotation of mixing chamber is periodically slowed, in order to create turbulence for better mixing outcome.

Mix and Dispense Process

- Active rotation and slowing occurs several times. Allowing for more homogenous suspension of powdered contents.

Mix and Dispense Process

- Active rotation and slowing process occurs several times. Alllowing for more homogenous suspension of powdered contents.

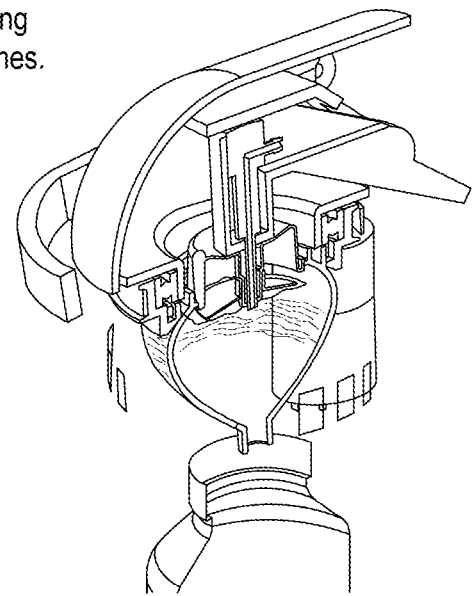

Fig. 35

Mix and Dispense Process

- Rotation of the pod and mixing chamber is ultimately stopped, allowing mixed contents to exit through the open bottom of the mixing chamber.

mixing chamber outlet (always open)

beverage container

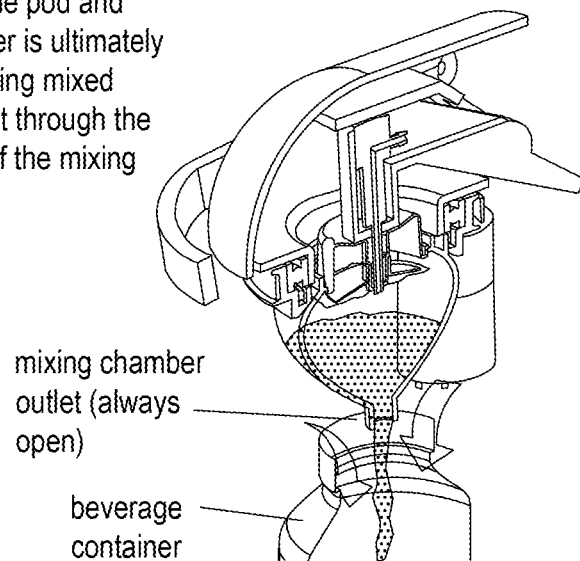

Fig. 36

DISPENSING APPARATUS AND METHOD

CROSS-REFERENCE TO RELATED APPLICATION DATA

This application claims priority to GB Patent Application No. 1817948.1, filed Nov. 2, 2018; GB Patent Application No. 1817946.5, filed Nov. 2, 2018 and U.S. Provisional Patent Application No. 62/622,225, filed Jan. 26, 2018, the contents of which are incorporated herein by reference in their entirety.

FIELD OF THE INVENTION

The present invention relates to a beverage dispensing apparatus and method. More particularly, the present invention relates to a pod containing a beverage preparation ingredient, a dispensing apparatus for dispensing the ingredient contained in such a pod, and a method of dispensing the ingredient contained in such a pod.

SUMMARY OF THE INVENTION

It has long been known to provide beverage preparation systems in which single servings of a powder or liquid (e.g. syrup) are provided in a suitable container or capsule. During preparation, water (either hot or cold) is typically introduced into the container via an opening, and caused to mix with the powder or liquid, before a dissolved drink, or in some cases a dispersion, exits the container via another opening. In this way, the drink ingredients are combined with the water inside the capsule, before being dispensed into a drinking vessel.

In such existing beverage preparation systems, once a beverage has been prepared, the used capsule must be removed or ejected from the system, so as to enable a subsequent beverage to be prepared. The used capsule may contain residual beverage preparation ingredients, and possibly a residue of the prepared drink. As such, the used capsule may be wet, and possibly sticky, making handling and/or disposal more complex than if the capsule were dry and clean.

Further, the incomplete emptying of capsules may result in a reduction in beverage preparation quality. In particular, where single drink servings are to be prepared, a precisely controlled quantity of a beverage preparation ingredient may be provided within a pre-prepared and pre-sealed capsule. However, if some (possibly variable) portion of this ingredient remains in the capsule after dispensing, the quantity of ingredients provided within the drink serving will inevitably be reduced, potentially affecting drink quality (e.g. flavour/nutrient balance).

It is an object of the present invention to provide an improved beverage preparation system and/or a system which overcomes or at least mitigates one or more problems associated with existing beverage preparation systems, whether identified herein or otherwise.

In aspects of the invention there is provided a pod for storing and dispensing a beverage preparation ingredient, the pod comprising a body defining a cavity for storing the beverage preparation ingredient; and an actuation member contained within said cavity. The actuation member is configured to cause an opening to be formed between said cavity and a region outside the pod when actuated. The beverage preparation ingredient stored within the cavity is released from the cavity via said opening during a dispensing operation.

The use of an actuation member which is contained within the pod allows the complete evacuation of the pod without any external component penetrating the pod, thereby ensuring that there are no external penetrating components which need to be cleaned between dispensing operations, or which could cause cross-contamination between successive dispensing cycles. Thus, the internal actuation member provides a convenient opening mechanism, which limits the extent to which external components need to be cleaned for re-use, thereby reducing the use of water during cleaning procedures.

It will also be understood that the provision of beverages, especially nutrient rich health beverages can reduce the number of single-use plastic bottles used to provide health drinks. Indeed, a pod may contain approximately 10 percent of the plastic content of a plastic water bottle. As such, a reduction in the volume of waste plastic of around 90% can be achieved. Additionally, the avoidance of pre-bottled drinks reduces the volume of water needing to be transported by road (or other forms of over-land transport). Rather, water can be provided to the apparatus from a mains water supply (e.g. via a tap, or by the apparatus being connected directly to the supply). In all of these ways, aspects of the present invention (which may incorporate pods and a dispensing apparatus) provide an environmentally friendly alternative to pre-bottled drinks.

According to a first aspect of the invention there is provided a pod for storing and dispensing a beverage preparation ingredient during a dispensing operation. The pod comprises a body defining a cavity for storing the beverage preparation ingredient; and an actuation member contained within said cavity. The actuation member is configured to cause an opening to be formed between said cavity and a region outside the pod when actuated. The opening is formed around a perimeter of a dispensing surface of the pod.

By providing the opening around the perimeter of the dispensing surface of the pod, the efficacy of ingredient release can be improved. In particular, ingredients contained within the pod may be caused to be urged towards the perimeter by rotation of the pod, and will therefore be caused to move towards and through the opening which is provided around the perimeter. Of course, the opening is not required to be precisely at the perimeter. For example, the opening may be generally around the outer edge of the surface, but may be within a rim of the pod body (and therefore the thickness of the rim within the perimeter).

Pod is used herein to refer to a container or capsule which is arranged to store and dispense a beverage preparation ingredient.

Said body may comprise a dispensing side and a closed side. At least one side wall may extend from the closed side to the dispensing side.

Said opening may be formed at a junction formed between the at least one side wall and the dispensing surface, the dispensing surface being provided at the dispensing side of the body.

Said opening may be formed around an internal perimeter of the side wall at the dispensing side.

By a junction formed between the at least one side wall and the dispensing surface, it is meant a change in direction of the surface defined by the side and the dispensing surface. For example, the where the pod is circular in cross section, a circular film (i.e. the dispensing surface) may be affixed to a single curved side wall. The opening may be formed at the point at which the film is joined to the side wall (before the opening has been formed, that is). By providing an opening in this location (i.e. around the internal perimeter of the side wall at the dispensing side), it is possible to provide effective ingredient dispensing without the need to flush the pod with fluid (e.g. liquid or pressurised air).

It will be understood that this is distinct from a pod in which a fixed base is provided which has a junction with a side wall, and in which an opening is formed elsewhere (e.g. an aperture which is formed within the base, away from the sidewall-base junction). In such an arrangement, the ingredient would be likely to become trapped in the corner formed by junction between the base and the side wall unless the pod was flushed with a fluid during dispensing.

The width of the opening may be at least as large as the width of the cavity adjacent to the opening, the width of the cavity being defined by the least one side wall. That is, rather than providing a relatively small opening into a larger cavity, by providing an opening which is at least as wide as the cavity, the likelihood of the ingredients becoming trapped, rather than dispensed, is reduced. The width of the opening and/or cavity may be a diameter.

The width of the cavity in a region adjacent to the opening may be constant or may increase towards the opening. On the other hand, if width decreased towards the opening, the ingredient could become stuck within cavity during dispensing, rather than being allowed to flow outwards. This is especially true where the pod is intended to be rotated during a dispensing operation.

The dispensing side may have a first diameter and the closed side may have a second diameter, the second diameter being less than the first diameter. The diameter of the cavity may gradually increase from the closed side to the open side.

In this way, the at least one side wall may be tapered such that the wall slopes outwards from the closed side to the dispensing side. Such a slope may reduce the extent to which the ingredient within the pod can become trapped, since the wall slopes outwards towards the opening, allowing the ingredient to be directed towards the opening when the pod is rotated.

The pod may be generally rotationally symmetrical about an axis of rotation, the at least one side wall comprising a curved surface disposed around the axis of rotation. The closed side and the dispensing side may be spaced apart along the axis of rotation.

A path may be defined along an internal surface of the at least one side wall from the closed side to the dispensing side. The at least one side wall may be configured such that the shortest distance between the path and the axis of rotation gradually increases from the closed side to the dispensing side. The shortest distance may monotonically increase from the closed side to the dispensing side.

The path may be free from interruptions. That is, rather than any kind of interruption (e.g. a rib, ridge or other reduction in diameter) to the flow of material from the cavity to the region outside the pod, by providing an uninterrupted path it is possible to improve the efficacy of ingredient dispensing.

The opening may be formed around the entire perimeter of the side wall. In this way, a complete opening may be formed, rather than having an opening provided at one region around the perimeter of the dispensing side and not another. This further reduces the opportunity for ingredients to become trapped (e.g. by parts of a closure film which remains connected to the side walls in places).

The pod may be configured to be rotated during said dispensing operation so as to cause the beverage preparation ingredient stored within the cavity to be released from the cavity via said opening.

By configuring the pod and opening such that the ingredient is caused to be released by rotation, it is possible to avoid the need for beverage ingredients to be washed or rinsed from the pod by water during a dispensing operation, as is typically the case with known pod-based beverage preparation systems. That is, the beverage preparation ingredient can be released without a liquid being required to be directed into the cavity. In particular, centrifugal forces can be used to urge the ingredients from the cavity through the opening, avoiding the need for the ingredients to be carried out by a fluid such as water. If water is required to be provided within the cavity, it is possible that dry ingredients (e.g. powders) may initially become sticky and/or form clumps, and may stick to the cavity walls, rather than being released. Significant volumes of water may be required to flush or rinse the cavity. Such difficulties can be avoided by the present invention.

The pod may comprise a central axis. The body may define a surface of revolution about said axis. During dispensing, the pod may be caused to rotate about said axis.

During dispensing, the pod may be caused to rotate at a predetermined rotation speed. The rotation speed may, for example be in the region of 200-600 revolutions per minute. The pod may be caused to rotate at least a minimum predetermined rotation speed. The minimum predetermined rotation speed may, for example, be around 200 revolutions per minute. A minimum speed may be preferred so as to ensure that the ingredient within the pod is urged towards and out of the opening by centrifugal forces created by the rotation.

The opening may be formed in a base of the pod. The base may comprise a generally planar surface disposed at the bottom of the pod during a dispensing operation. The base may be referred to as the dispensing surface. When the opening is formed in the base during a dispensing operation, gravity will cause the ingredients to fall towards the base, and through the opening.

The cavity may remain sealed during a dispensing operation except for the opening or openings formed by the actuation member. That is, the actuation member which is provided within the cavity may be the only component to form an opening, with the remainder of the cavity walls (e.g. the body of the pod) remaining un-compromised.

Said opening may provide a direct path from within the cavity to a region outside the pod. By providing a direct path from the cavity to the region outside the cavity, it is possible to provide an efficient release path for ingredients, without requiring the ingredients to follow a complicated (i.e. indirect) fluid flow path to be released. In this way, gravity, and/or centrifugal forces can be used to urge the ingredients from the cavity towards the outside region, avoiding the need for the ingredients to be carried out by a fluid such as water. By direct path it may be meant a straight line path, which does not pass around corners, and/or which does not pass through intermediate materials (e.g. filters or membranes).

Said body may comprise a dispensing side and a closed side, the pod further comprises a closing member for closing said dispensing side, thereby sealing said cavity.

The closing member may be caused to seal the cavity during manufacture, so as to seal the ingredient within the pod until it is to be released in a dispensing operation. The dispensing side may be referred to as an open side. The closing member may comprise a film defining the dispensing surface.

At least a portion of the closed side and at least a portion of the dispensing side may be separated in a direction parallel to the axis by a distance defining a depth of the pod.

The body may comprise a top region defining the closed side, and at least one wall, extending from the closed side to the dispensing side.

The base may have a first diameter and the closed side may have a second diameter, the second diameter being less than the first diameter. In this way, the at least one wall may be tapered such that the wall slopes outwards from the closed side to the base. Such a slope may reduce the extent to which the ingredient within the pod can become trapped, since the wall slopes outwards towards the opening, allowing the ingredient to be directed towards the opening when the pod is rotated.

The body may comprise a sealing rim extending around a perimeter of the dispensing side, the closing member being sealed to the sealing rim.

The sealing rim may comprise a portion of the at least one wall. The sealing rim may comprise a thickened end portion of the at least one wall.

The actuation member may be configured to engage with said closing member to form said opening when actuated.

The actuation member may be configured to press against the closing member during said dispensing operation.

The actuation member may be configured to peel the closing member away from the body, thereby forming the opening. The actuation member may be configured to pierce the closing member, so as to cause a portion of the closing member to be separated from a portion of the closing member which is sealed to the body, thereby forming the opening.

The body may further comprise a sealing region disposed towards the centre of the dispensing side, the closing member being sealed to the sealing region.

By providing a primary sealing region (i.e. the perimetrical sealing rim) and a secondary sealing region (i.e. the sealing region), it is possible to cause one sealing region to become opened (e.g. by peeling or piercing around the sealing rim), while the other of the sealing regions remains sealed. In this way, the ingredients contained within the cavity can be released, while the closing member (e.g. film) can remain attached to the pod body, so as to prevent it falling away from the pod, and potentially interfering with subsequent processing.

The sealing region need not be strictly at the centre of the dispensing side. Rather the sealing region may be provided at any part of the dispensing side which is disposed away from and within the perimeter. Conveniently, the central sealing region may comprise a generally circular sealing surface provide around the centre of the dispensing surface (but which may, for example, not extend across the centre of the dispensing surface.

The sealing region and the sealing rim may be in a common plane. Thus, when sealed by a film, the film which is sealed to the sealing rim and the sealing region may lie substantially in said plane and may define a dispensing surface.

The body may be configured to flex during said dispensing operation so as to cause the actuation member to form the opening.

The pod may be configured to flex, or deform, elastically, so as to return to its original shape when the actuating force is removed.

The actuation member comprises a separator. The separator may be formed as a separate component from the body. During a dispensing operation, the separator may be configured to cause at least portion of the closing member to be separated from the body, thereby forming the opening. The separator may be configured to cause a part (but not all) of the closing member to be separated from the sealing rim of the body (e.g. by piercing, penetrating, shearing, or tearing the closing member), or to cause substantially all of the closing member to be separated from the sealing rim of the body (e.g. by peeling the closing member away from the sealing rim).

The separator may comprise a hub and a pusher region disposed around and extending away from the hub.

The hub may be generally cylindrical, the pusher region being attached around the circumference of the hub, and extending radially away from the hub. The pusher region may also extend in a direction parallel to an axis of the cylindrical hub. The pusher region may be generally cone-shaped. The pusher region may extend from the hub towards the dispensing surface (e.g. the base) of the pod.

The pusher region may comprise a single conical surface, or may comprise a plurality of flat or curved surfaces which together generally define a conical shape. The pusher region may comprise a plurality of ribs extending radially away from the hub. The ribs may support peeling or piercing plates disposed at an end of the rib away from the hub.

A perimeter of the pusher region (i.e. the edge of the pusher region furthest from the hub) may be configured, in use, to press against the closing member, so as to urge the closing member in a direction away from the body.

The sloping pod side walls may also assist the opening of the pod, since the sloping walls will guide the actuation member towards the closing member. A chamfered region may be provided around the internal edge of the sealing rim, so as to guide the pusher region towards the closing member, focusing forces transmitted through the pusher region towards the junction between the closing member and the body, so as to cause efficient peeling or piercing of the closing member.

The pod may comprise an actuator engagement region for engagement with a corresponding actuator of a dispensing system.

The actuator engagement region may be provided in the closed side of the pod. The actuator engagement region may comprise a concave region configured to receive a correspondingly shaped actuator.

The actuator engagement region may be provided generally centrally with respect to said body (i.e. generally centrally with respect to said axis). The actuator engagement region may comprise a channel passing from the closed side to the dispensing side. The channel may be generally conical, having a first diameter at the closed side and a second (smaller) diameter at the dispensing side. The channel may be concentric with said axis.

The actuator engagement region may comprise a channel wall, extending from the closed side to the dispensing side. The (secondary) sealing region may comprise a thickened portion of the channel wall.

During said dispensing operation the body may be caused to flex when the actuator is engaged with said actuator engagement region and moved along the axis towards the dispensing surface.

The actuation member may be configured to press against the closing member during said dispensing operation when said actuator is moved towards said dispensing surface.

The actuator engagement region may be configured to engage with the actuation portion hub so as to cause the pusher region to press against the film so as to cause said opening to be formed.

The pod may comprise a mounting region for engagement with a corresponding pod support region of a dispensing apparatus.

The mounting region may comprise a rim of said body, and a flange disposed around an external surface of the rim, offset from the dispensing surface. The mounting region may permit the pod to be securely held in the dispensing apparatus during a dispensing operation.

According to a second aspect of the invention there is provided a method for dispensing a beverage preparation ingredient from a pod according to the first aspect of the invention. The method comprises providing a pod at a pod support location, applying an actuation force to an actuator engagement region of the pod to cause the opening to be formed in the pod, and rotating the pod. The method may further comprise providing a liquid to be mixed with said released beverage preparation ingredient.

There is also provided a dispensing apparatus for dispensing a beverage preparation ingredient from a pod according to the first aspect of the invention. The apparatus comprises a pod support region configured to support the pod, and an actuator configured to engage with a corresponding actuator engagement region of the pod. The apparatus is configured to cause the actuation member to cause an opening to be formed in the pod supported by the pod support region during a dispensing operation, so as to cause the beverage preparation ingredient to be released from the pod via said opening. The dispensing apparatus may further comprise a rotation mechanism for rotating the pod. The apparatus may be further configured to cause the rotation mechanism to cause the pod to rotate about an axis of rotation during said dispensing operation, so as to cause the beverage preparation ingredient to be released from the pod via said opening.

According to a third aspect of the invention there is provided a dispensing apparatus for dispensing a beverage preparation ingredient from a pod. The dispensing apparatus comprises a pod support region configured to support a pod, an actuator configured to engage with a corresponding actuator engagement region of the pod, and a rotation mechanism for rotating the pod. The apparatus is configured to cause the actuation member to cause an opening to be formed in a pod supported by the pod support region. The apparatus is further configured to cause the rotation mechanism to cause the pod to rotate about an axis of rotation during a dispensing operation, so as to cause the beverage preparation ingredient to be released from the pod via said opening.

Rotation of the pod during the dispensing cycle provides an efficient mechanism for evacuating the beverage preparation ingredient (e.g. a dry powder) from the cavity. Rather than being flushed out of the pod by water (as is commonly the case in known beverage preparation systems), rotation drives the beverage preparation ingredient away from the centre of the pod, causing it to fall through the opening created by the actuation member provided within the pod).

The pod may be a pod for storing and dispensing a beverage preparation ingredient during a dispensing operation. The pod may comprise a body defining a cavity for storing the beverage preparation ingredient. The pod may further comprise an actuation member contained within said cavity. The actuation member may be configured to cause an opening to be formed between said cavity and a region outside the pod when actuated by the actuator member of the apparatus. The opening may be formed around a perimeter of a dispensing surface of the pod.

It will be understood that the provision of beverages, especially nutrient-rich health beverages, can reduce the number of single-use plastic bottles used to provide health drinks. Additionally, the avoidance of pre-bottled drinks reduces the volume of water needing to be transported by road (or other forms of over-land transport). Rather, water can be provided to the apparatus from a mains water supply (e.g. via a tap, or by the apparatus being connected directly to the supply). In all of these ways, aspects of the present invention (which may incorporate pods and a dispensing apparatus) provide an environmentally friendly alternative to pre-bottled drinks.

The beverage preparation ingredient is preferably a soluble beverage preparation ingredient (e.g. a soluble powder or concentrate).

The dispensing apparatus may further comprise a mixing chamber, the mixing chamber comprising an inlet for receiving at least one beverage preparation ingredient from said pod.

The mixing chamber may comprise an outlet for dispensing a mixed beverage. The apparatus may be configured to cause the beverage preparation ingredient to be mixed within the mixing chamber and then dispensed from the mixing chamber into a suitably placed vessel. The apparatus may be configured to cause the beverage preparation ingredient to be mixed with a liquid (e.g. water).

The mixing chamber may comprise at least one wall defining a mixing cavity. The mixing chamber may be generally rotationally symmetric about the axis of rotation of the pod (such that mixing chamber has a generally circular cross-section in planes normal to the axis of rotation). In normal operation, the mixing chamber inlet is provided at the top of the mixing chamber, with the outlet being provided at the bottom.

The dispensing apparatus may be part of, or may be referred to as, a beverage preparation system The dispensing apparatus may further comprise a mixing device provided within the mixing chamber for mixing the at least one beverage preparation ingredient.

The dispensing apparatus may further comprise an actuation assembly for actuating the mixing device.

The actuation assembly may be configured to form a seal with the inlet during a mixing operation.

The actuation assembly may, in use, comprise a pod, the pod being configured to close an aperture when provided at the pod support region.

The actuation assembly may be configured to transfer rotational movement to the mixing device.

The actuation assembly may comprise said rotation mechanism for rotating the pod, the dispensing apparatus being configured such that a mixing device engagement feature of the pod is caused to transfer rotational movement from the pod to the mixing device.

By causing rotation of the mixing assembly via the pod there may be provided a simple mechanical arrangement in which the number of openings into the mixing chamber are minimised. Thus, rather than having a directly driven mixing device within the chamber (which might need to be driven by a drive shaft, or other mechanical coupling), the pod (which is itself rotated during dispensing) can be used as a drive mechanism.

The actuation assembly may be configured to transfer rotational movement to the mixing device via said inlet. In this way, the number of apertures in the mixing chamber may be reduced.

The dispensing apparatus may further comprise a valve assembly provided within the mixing chamber, the valve assembly being configured to seal an outlet of the mixing chamber, the outlet being disposed generally opposite from the inlet.

The valve assembly may be configured to seal the outlet during a mixing operation, and to permit the contents of the mixing chamber to be dispensed through the outlet after said mixing operation.

It will of course be appreciated that there is no requirement to provide a perfect seal between the valve assembly and the mixing chamber outlet, such that some liquid may escape through the outlet even when it is considered to be 'sealed'. However, the valve assembly may be configured to substantially seal the outlet when required, so as to prevent a majority of the content of the mixing chamber from being released for sufficiently long to enable thorough (or thorough enough) mixing to take place.

The valve assembly may be operated by engagement with the actuation assembly via said inlet.

The actuation assembly may be configured to cause at least a portion of the valve assembly to move along a movement axis. The movement axis may be parallel to or co-axial with the axis of rotation of the pod.

The valve assembly may comprise a valve rod extending from a sealing portion disposed at the lower end of the mixing chamber to an engagement portion disposed at the upper end of the mixing chamber for engagement with the actuation assembly.

The valve assembly may comprise a biasing member configured to urge the valve assembly into an open configuration.

The valve assembly may incorporate one or more features adapted to reduce the accumulation of unwanted matter on a surface of said valve assembly. Said one or more features may comprise at least one sloping surface, configured to cause any incident matter to run off towards the outlet. Said at least one sloping surface may comprise a surface profile having no local minima or low points, such that incident matter is caused to run off the surface towards the outlet, rather than collecting in any local low points.

The actuation assembly may comprise a valve actuating rod which, in use, is configured to extend through a portion of the pod and to engage with an engagement portion of the valve assembly.

In use, the valve actuating rod may be configured to move substantially vertically with respect to the mixing chamber so as to vertically displace said engagement portion of the valve assembly, thereby actuating the value assembly.

The mixing device may comprise a mixing paddle. The mixing paddle may comprise at least one mixing arm extending from a hub.

The mixing paddle may be configured to rotate about an axis. The axis may be co-axial with the axis of rotation of the pod. The mixing paddle may comprise a plurality of (e.g. two) mixing arms. The mixing paddle hub may be configured to rotate relative to the valve rod.

The mixing paddle may comprise at least one pod engagement feature for engagement with a paddle engagement feature of the pod.

Rotation may be transferred from the pod to the (or each) pod engagement feature by friction. Rotation may be transferred from the pod to the (or each) pod engagement feature via a clutch (e.g. a dog clutch).

The mixing paddle may comprise a plurality of pod engagement features. The or each pod engagement feature may extend radially away from the hub, and/or upwards from hub in a direction parallel to the axis, in a normal orientation.

The apparatus may be configured to cause relative movement between the actuator and the pod support region, thereby causing said opening to be formed in a pod supported by the pod support region.

The pod support region may be configured to support a mounting region of the pod.

Said relative movement may comprise cause the actuator to move towards the pod support region. Said relative movement between the actuator and the pod support region may cause the pod to be deformed The dispensing apparatus may further comprise an actuator drive mechanism configured to cause said relative movement between the actuator and the pod support region, the actuator drive mechanism comprising a linkage assembly, and a prime mover configured to drive said linkage assembly.

The use of an automatically actuated (i.e. self-actuated) actuator assembly reduces the likelihood of miss-use, which could lead to breakage (especially where significant forces were required to be applied by a user).

The linkage assembly may comprise an actuator link, the actuator being driven by an actuating end of the actuator link during a dispensing operation.

The actuator link may be referred to as a pushing link.

The prime mover may comprise a motor. The use of a motor driven linkage assembly ensures that the actuation force is generated by components within the apparatus, rather than requiring significant space to be left for the manual operation of a long lever. A motor may be positioned conveniently within the apparatus, with the linkage assembly converting rotational movement to the linear movement required to actuate the pod.

The pod support region may be configured rotate during said dispensing operation.

The rotation mechanism may be coupled to the pod support region so as to cause the pod support region to rotate, thereby causing a supported pod to rotate. The rotation mechanism may comprise a motor. The motor may be coupled to the pod support region by a belt (e.g. a timing belt).

At least a portion of the actuator may be configured to rotate with the pod.

A first portion of the actuator may be configured to rotate with the pod, and a second portion of the actuator may be configured not to rotate with the pod.

The actuator may be configured to move in a generally downwards direction during a dispensing operation relative to the pod support region.

Moving the actuator downwards causes the actuator to cause the actuation member within the pod to form an opening at the bottom of the pod, thereby allowing the ingredient contained within the pod to be released from the bottom of the pod, under the influence of gravity.

The actuator may be configured to move axially along the axis of rotation.

Of course, in an embodiment the pod support region may be configured to move upwards, such that relative movement between the actuator and pod support region can be achieved by moving the pod support region upwards relative to the actuator.

The valve actuating rod may extend through a portion of the actuator to engage with said engagement portion of the valve assembly.

The pod support region may be fixed in position relative to the axis of rotation in a direction parallel to the axis of rotation.

That is, while the pod support region may rotate during dispensing, it does not move along the axis of rotation, thereby providing a fixed reference against which the actuator can move, thereby causing the actuation member to form the opening.

The dispensing apparatus may have a first configuration in which a pod is supported by said pod support region and said actuator is at a first position relative to the pod support region, and a second configuration in which said actuator is at a second position relative to the pod support region, the apparatus being configured to transition from the first configuration to the second configuration during a dispensing operation. In the first configuration, the pod may be in a closed state. In the second configuration, the pod may be in an open state.

By causing relative movement between the pod support region and the actuator, the pod can be opened. The second position may be lower than the first position.

During a first transition from the first configuration to the second configuration, the actuator link may be caused to rotate about a pivot in a first direction by the prime mover.

During the first transition, the actuator link may be caused to deliver an actuation force via the actuator. During the first transition, the actuator link may be caused to rotate through a relatively small angle.

During a first part of said first transition the valve actuating rod may be configured to move vertically down with respect to the mixing chamber, so as cause said valve assembly to seal the outlet. During a second part of said first transition the pod engagement portion of the actuator may be configured to move vertically down with respect to the pod support so as cause the pod to be opened.

The dispensing apparatus may further have a third configuration in which said actuator is at a third position relative to the pod support region, the actuator being separated from the pod support region in the third configuration so as to permit a pod to be placed on the pod support region.

The apparatus may be configured to transition from the third configuration to the first configuration during a dispensing operation. The apparatus may be configured to transition from the third configuration to the first configuration at least partially by movement of a closing mechanism by a user. The closing mechanism may comprise an apparatus cover portion. The apparatus cover portion may be coupled to the actuator by said linkage assembly.

During a second transition from the first configuration to the third configuration, the actuator link may be caused to pivot about a pivot in a second direction, the second direction being opposite to the first direction.

During the second transition from the first configuration to the third configuration, the actuator link not required to deliver a significant force. However, the angular movement of the actuator link in the second transition may be greater (e.g. several times greater) than during the first transition.

A first part of said second transition may be caused by said actuator drive mechanism, and a second part of said second transition may be caused by a user. In this way, the actuator drive mechanism may be caused to move the apparatus to a configuration intermediate the first and third configurations in which the actuator is slightly spaced apart from the pod. Then, a user may operate the apparatus to fully a fully open configuration so that a used pod can be removed (and/or a new pod inserted).

During the first and second transitions, the actuator link may pivot about different pivots.

The apparatus may be configured to transition back from the third configuration to the first configuration at least partially by movement of the actuator drive mechanism. A first part of said transition may be caused by a user, and a second part of said transition may be caused by said actuator drive mechanism. It will be understood that this is the reverse of the transition from the first configuration to the third configuration.

During at least a part of the second transition, the actuator link may be de-coupled from the prime mover.

In this way, a user can easily open the apparatus so as to remove/place a pod. Rather than being driven by the prime mover (which may be required to output significant force over a relatively short range of motion during the first transition), the opening mechanism may be user operated, and may require only a relatively small force, but over a relatively long range of motion. By decoupling the prime mover during this movement, it is possible to provide a simple and convenient opening mechanism, while also limiting the number of functions required to be performed by the prime mover, therefore simplifying the linkage assembly.

The rotation mechanism may be configured to cause the pod to rotate during said transition from the first configuration to the second configuration.

By rotating during the period in which the opening is formed, the beverage preparation ingredients are effectively released from the pod, and may be flung from the pod towards the walls of the mixing chamber, rather than falling towards the centre of the mixing chamber.

The rotation mechanism may be configured to cause the pod to continue to rotate after said transition from the first configuration to the second configuration for a predetermined period of time.

This further rotation may ensure that substantially all of the ingredients are evacuated from the pod. The further rotation may also be used to cause the ingredients to be well mixed in the mixing chamber.

The dispensing apparatus may be further configured to dispense a liquid for mixing with the beverage preparation ingredient. The liquid is preferably water.

The dispensing apparatus may be further configured to dispense said liquid to a location external of the pod. The absence of liquid (e.g. water) within the pod, and the mixing of liquid with the beverage drink preparation ingredient (e.g. powder) externally of the pod, means that ingredients within the pod do not become sticky, thereby providing a reliable dispensing mechanism for controlled doses of beverage preparation ingredients.

The dispensing apparatus may comprise a first liquid outlet configured to dispense liquid into the mixing chamber. The first liquid outlet may be configured to dispense liquid directly into the mixing chamber. The first liquid outlet may be provided at a rim of the mixing chamber. The first liquid outlet may comprise a plurality of nozzles. The plurality of nozzles may be disposed around the rim of the mixing chamber. The rim may extend around the inlet through which the beverage preparation ingredient is provided. The outlet may be configured to direct one or more jets of liquid towards the mixing device.

The dispensing apparatus may comprise a second liquid outlet configured to dispense liquid into a vessel configured to receive a beverage. The second liquid outlet may be configured to dispense liquid directly into the vessel. The vessel may be a vessel provided below the outlet of the mixing chamber. As such, the second liquid outlet may bypass the mixing chamber entirely. The second liquid outlet may, for example, be used to top-up a drink to a predetermined level, or to provide an unmixed drink (e.g. chilled and/or filtered water).

The liquid may be dispensed during said transition from the first configuration to the second configuration. The liquid may be dispensed after said transition from the first configuration to the second configuration. In addition to or instead of liquid being dispensed during the period when the pod is opened, liquid may be dispensed after the pod has been opened. During this period, the pod contents will continue to be released, and mixing can take place.

The dispensing apparatus may be further configured to dispense a liquid for rinsing a portion of the dispensing apparatus. Additional liquid may be dispensed to rinse the mixing chamber after a beverage has been mixed and dispensed.

The actuator may comprise a pod engagement portion which is substantially co-axial with the axis of rotation.

The pod engagement portion may comprise a convex portion configured to be inserted into a correspondingly shaped (i.e. concave) actuator engagement region of the pod.

The pod engagement portion may be generally rotationally symmetric about the axis of rotation. By making the actuator generally rotationally symmetric, the angular position of the pod relative to the actuator does not matter, such that the pod can engage with the actuator regardless of installation orientation. Of course, it is not necessary for the pod engagement portion to be strictly rotationally symmetric. For example, whereas the pod engagement portion may approximate a cone in some embodiments, a pyramid (e.g. a regular, or right, pyramid) may be equally effective. For example a regular octagonal pyramid may provide for a relatively uniform force transfer between the actuator and the pod.

The pod engagement portion may have a first width in a direction perpendicular to the axis at a first location and a second width in a direction perpendicular to the axis at a second location, the second width being smaller than the first width. The apparatus may be configured to cause the second location of the pod engagement portion to be inserted into the actuator engagement portion of the pod during a dispensing operation. The second (narrower) location may be inserted into the actuator engagement portion before the first (wider) location. The first and second locations may be referred to as first and second ends. The pod engagement portion may approximate a frustum. The pod engagement portion may be approximately frustoconical, such that the first width is a first diameter and/or the second width is a second diameter.

Of course, it will also be understood that the pod engagement portion is not required to have a linearly varying diameter (or width) along the axis of rotation (as would be the case with a true cone or pyramid). Rather, the width may generally increase from first location to the second location following any convenient profile (e.g. a curved profile). The profile may have discontinuities (e.g. stepped sides).

According to a fourth aspect of the invention there is provided a beverage preparation system comprising:
  a mixing chamber, the mixing chamber comprising an inlet for receiving at least one beverage preparation ingredient;
  a mixing device provided within the mixing chamber for mixing the at least one beverage preparation ingredient;
  an actuation assembly for actuating the mixing device;
  wherein the actuation assembly comprises a pod containing said at least one beverage preparation ingredient, the pod comprising a mixing device engagement feature configured to transfer rotational movement from the pod to the mixing device.

By causing rotation of the mixing device via the pod there is provided a simple mechanical arrangement in which the number of openings into the mixing chamber are minimised. Thus, rather than having a directly driven mixing device within the chamber (which might need to be driven by a drive shaft, or other mechanical coupling), the pod (which is itself rotated during dispensing) can be used as a drive mechanism.

According to a fifth aspect of the invention there is provided a beverage preparation system comprising:
  a mixing chamber, the mixing chamber comprising an inlet for receiving at least one beverage preparation ingredient and an output disposed generally opposite from the inlet for dispensing a mixed beverage;
  a mixing device provided within the mixing chamber for mixing the at least one beverage preparation ingredient;
  a valve assembly provided within the mixing chamber, the valve assembly being configured to seal the output of the mixing chamber;
  wherein the mixing paddle and the valve assembly are configured for engagement with an actuation assembly via the inlet.

By providing coupling to both of the mixing paddle and the valve assembly via the same inlet, which is also configured to receive the beverage preparation ingredient, it is possible to provide a simplified mechanical arrangement, with minimal mixing chamber apertures.

The dispensing apparatus may further comprise a liquid reservoir for storing liquid to be dispensed. The dispensing apparatus may further comprise a pump configured to deliver liquid from said reservoir to one or more liquid outlets. The dispensing apparatus may further comprise a filter configured to filter liquid stored within said reservoir. The dispensing apparatus may further comprise a cooling apparatus configured to cool liquid stored within said reservoir.

The dispensing apparatus may further comprise a controller configured to control one or more parts of a dispensing operation and/or a mixing operation. The controller may be configured to control an operation of the prime mover and/or the rotation mechanism. The controller may be configured to control an operation of the pump. The dispensing apparatus may comprise at least one controllable valve. The controller may be configured to control an operation of said at least one controllable valve. The controller may be configured to cause the dispensing apparatus to perform a plurality of steps during a dispensing operation. The dispensing operation may comprise a mixing operation.

According to a further aspect of the invention there is provided a beverage preparation system comprising a dispensing apparatus for dispensing a beverage preparation powder from a pod, a mixing chamber for receiving said beverage preparation powder from a pod, and a liquid dispensing device for dispensing a liquid into said mixing chamber. The system is configured to cause a beverage preparation powder to be released from a pod into the mixing chamber, a liquid to be dispensed into the mixing chamber, the beverage preparation powder and the liquid to be mixed in the mixing chamber, and the mixed beverage preparation powder and liquid to be dispensed from an outlet.

The apparatus may comprise a pod support region configured to support a pod and an actuator configured to engage with a corresponding actuator engagement region of the pod. The apparatus may be configured to cause the actuation member to cause an opening to be formed in a pod supported by the pod support region, thereby allowing the beverage preparation powder to pass from the pod to the mixing chamber.

The apparatus may further comprise a rotation mechanism for rotating the pod. The rotation mechanism may be configured to cause the pod to rotate about an axis of rotation during a dispensing operation, so as to cause the beverage preparation powder to be released from the pod via said opening.

According to a sixth aspect of the invention there is provided a method of operating a dispensing apparatus for dispensing a beverage preparation ingredient from a pod, the apparatus comprising:
a pod support region configured to support a pod;
an actuator configured to engage with a corresponding actuator engagement region of the pod; and
a rotation mechanism for rotating the pod;
the method comprising:
providing a pod at the pod support region;
causing, by the actuator, the actuation member to cause an opening to be formed in said pod; and
rotating, by the rotation mechanism, the pod about an axis of rotation, so as to cause the beverage preparation ingredient to be released from the pod via said opening.

The pod may be a pod according to the first aspect of the invention.

The method may comprise releasing said beverage preparation ingredient from the pod into a mixing chamber.

The method may further comprise mixing said released beverage preparation ingredient in said mixing chamber. Said mixing may comprise rotating a mixing device provided within said mixing chamber.

Said rotating of the mixing device may be by said rotation mechanism. Said rotation mechanism may be coupled to the mixing device by the pod.

The method may further comprise dispensing a liquid into said mixing chamber to be mixed with said beverage preparation ingredient.

Said rotating may comprise rotating at at least a predetermined minimum rotation speed. Rotation at at least a minimum speed will ensure that the beverage preparation ingredient is effectively released from the pod.

Said rotating may comprise rotating for at least a predetermined minimum rotation duration. Rotation for a minimum rotation duration will ensure that the beverage preparation ingredient is effectively released from the pod.

Said rotating may comprise varying a rotation speed during a dispensing operation.

By varying the rotation speed, accelerations and decelerations can be used to improve the efficacy of ingredient release from the pod, and/or to increase the efficacy of mixing within the mixing chamber.

The method may comprise sealing an outlet of a mixing chamber before the commencement of a mixing operation, and opening said outlet of the mixing chamber after the completion of a mixing operation. Of course, the mixing chamber outlet may be opened and closed (i.e. sealed) a plurality of times.

The method may comprise the steps of:
sealing an outlet of a mixing chamber;
dispensing a liquid into said mixing chamber;
mixing said liquid with said beverage preparation ingredient by rotating a mixing device provided within said mixing chamber; and
opening said outlet of the mixing chamber to dispense the mixed beverage.

Said dispensing may be performed after said sealing, and so on.

The method may further comprise the steps of:
re-sealing said outlet of a mixing chamber;
dispensing additional liquid into said mixing chamber; and
re-opening said outlet of the mixing chamber to release the additional liquid.

The re-sealing of the outlet (and subsequent dispensing of addition liquid and re-opening of the outlet) may be performed after said dispensing of the mixed beverage. Dispensing additional liquid into the mixing chamber after a mixing operation allows the mixing chamber and mixing device to be cleaned.

The method may further comprise the step of rotating the mixing device within the mixing chamber after said additional liquid has been dispensed so as to clean the mixing chamber.

Causing the actuation member to cause an opening to be formed in said pod may be performed after said sealing an outlet of a mixing chamber, and before said opening said outlet of the mixing chamber.

Causing the actuation member to cause an opening to be formed in said pod may be performed after said dispensing a liquid into said mixing chamber.

Said rotation mechanism may be caused to commence rotation of said pod and said mixing device before the opening is formed in the pod.

The method may further comprise, before a dispensing operation, moving said actuator to a position spaced apart from the pod support region so as to permit a pod to be placed on the pod support region.

The method may further comprise, after a dispensing operation, moving said actuator to a position spaced apart from the pod support region so as to permit a pod to be removed from the pod support region.

It will, of course, be appreciated that features described in the context of one aspect of the invention may be combined with features described in the context of other aspects of the invention. For example, features of the pod (described as the first aspect above) may be combined with features of the dispensing apparatus (third to fifth, and further aspects), or the dispensing methods (second and sixth aspects) and vice versa. For example, a dispensing apparatus according to one aspect may be caused to dispense ingredients from a pod according to another aspect. Similarly, a pod may be actuated by performing a method according to another aspect.

BRIEF DESCRIPTION OF THE DRAWINGS

Embodiments of the invention will now be described, by way of example, with reference to the accompanying drawings in which:

FIG. 7a shows a cross-section drawing of a cartridge assembly of the beverage preparation apparatus shown in FIG. 1;

FIG. 7b shows a portion of the cartridge assembly illustrated in FIG. 7a;

FIG. 8 shows a schematic drawing of a rotation mechanism of the beverage preparation apparatus shown in FIG. 1;

FIG. 17 shows a cooling element;

FIGS. 18a and 18b show a chiller block;

FIG. 19 shows a chiller tank;

FIG. 20 shows a complete chiller tank and a cutaway chiller tank;

FIGS. 27 to 36 show various steps in a mix and dispense process.

DETAILED DESCRIPTION

Figure 1:
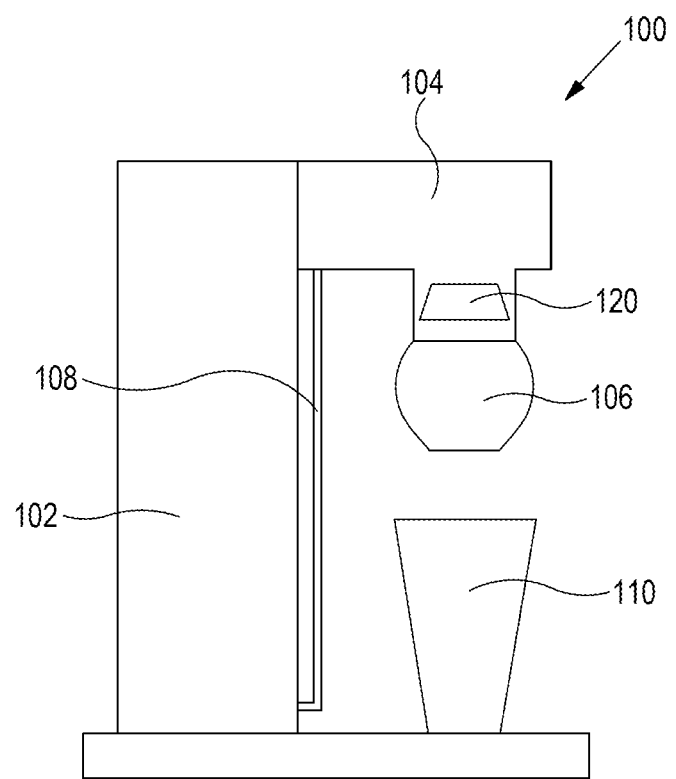
FIG. 1 shows a schematic drawing of a beverage preparation apparatus according to an embodiment of the invention.

In more detail, FIG. 1 shows a beverage preparation apparatus 100 comprising a water storage reservoir 102, a dispensing assembly 104, and a mixing chamber 106. A water supply pipe 108 connects the reservoir 102 to the dispensing assembly 104. In use, a vessel 110 (e.g. a cup or bottle) is provided to receive a dispensed beverage, and a pod 120 containing a beverage preparation powder is provided within the dispensing assembly 104.

The beverage preparation apparatus 100 may, for example, comprise a countertop beverage dispenser, or other equivalently small and/or portable unit. In some embodiments the beverage preparation apparatus 100 may be connected to a water supply rather than (or as well as) having an integrated reservoir. Water stored in the reservoir may be chilled and/or filtered. The beverage preparation apparatus 100 may include a controller and a variety of pumps and/or valves (e.g. controllable valves) configured to control the apparatus to perform a beverage preparation process including a dispensing operation.

Figure 2:
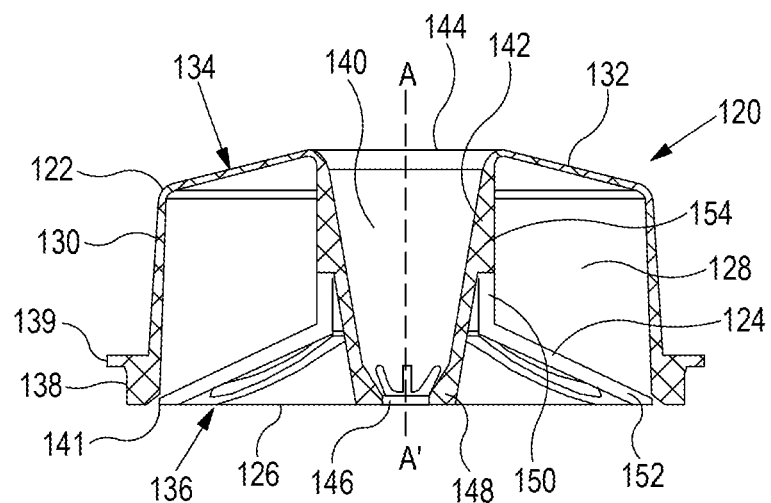
FIG. 2 shows a cross-section of a beverage preparation pod according to an embodiment of the invention.

Referring now to FIG. 2, in which the pod 120 is shown in more detail, it can be seen that the pod comprises three components: a body 122, a release plunger 124 and a film 126. The film 126 may be referred to as a base. These three components are shown in exploded form in FIG. 3. A cavity 128 is defined within the pod 120, the beverage preparation powder being stored within the cavity 128.

It will be appreciated that in some embodiments an alternative form of beverage preparation ingredient may be provided within the capsule. For example, in an embodiment the beverage preparation powder may be replaced by a liquid or gel. Alternatively, in an embodiment granules of a beverage preparation ingredient may be provided. The beverage preparation powder or other material may comprise one or more ingredients.

The beverage preparation powder may, for example, comprise vitamins, minerals, and/or flavourings. The composition can be varied as required so as to provide a particular type of beverage. Typically the ingredients will be soluble, or dispersible, such that a beverage can be prepared by mixing water with the ingredients without any filtration being required.

The body 122 has side walls 130 and a top wall 132. The body 122 may, for example, be formed as a single molded component. The walls 130, 132 partially define the cavity 128, the cavity 128 being further defined by the film 126, which seals the cavity 128. The top wall 132 is disposed at a closed side 134 of the pod 120. The film 126 is provided at an open side 136 of the pod 120. That is, the body 122 is continuous across the closed side of the pod such that it does not permit access to the cavity 128 from the closed side 134. The side walls 130 of the body extend from the closed side 134 to a rim 138 which extends around the perimeter of the open side 136. However, there is no part of the body 130 which extends across the open side 136, presenting an opening. Of course, as noted above, this opening is effectively sealed by the film 126, which is sealed to the rim 138.

The open side is separated from the closed side by in a direction parallel to the axis A-A' by a distance defining a depth of the pod. The pod depth may, for example, be between 10 mm and 30 mm (e.g. around 20 mm). The open side may, for example, have an outer diameter of around 45-50 mm, with the opening having an inner diameter of around 42-45 mm. At a point of transition between the side walls 130 and the top 132, the body may, for example, have a diameter of around 40-44 mm. In this way, the walls 130 are slightly tapered such that the wall slopes outwards from the closed side to the open side or base. The slope may reduce the extent to which the ingredient within the pod can become trapped during operation, since the wall slopes outwards towards the opening which may be formed around the perimeter of the base, allowing the ingredient to be directed towards the opening when the pod is rotated.

It will, of course, be appreciated that alternative pod dimensions to those described above (and below) may be used as preferred.

Figure 5:
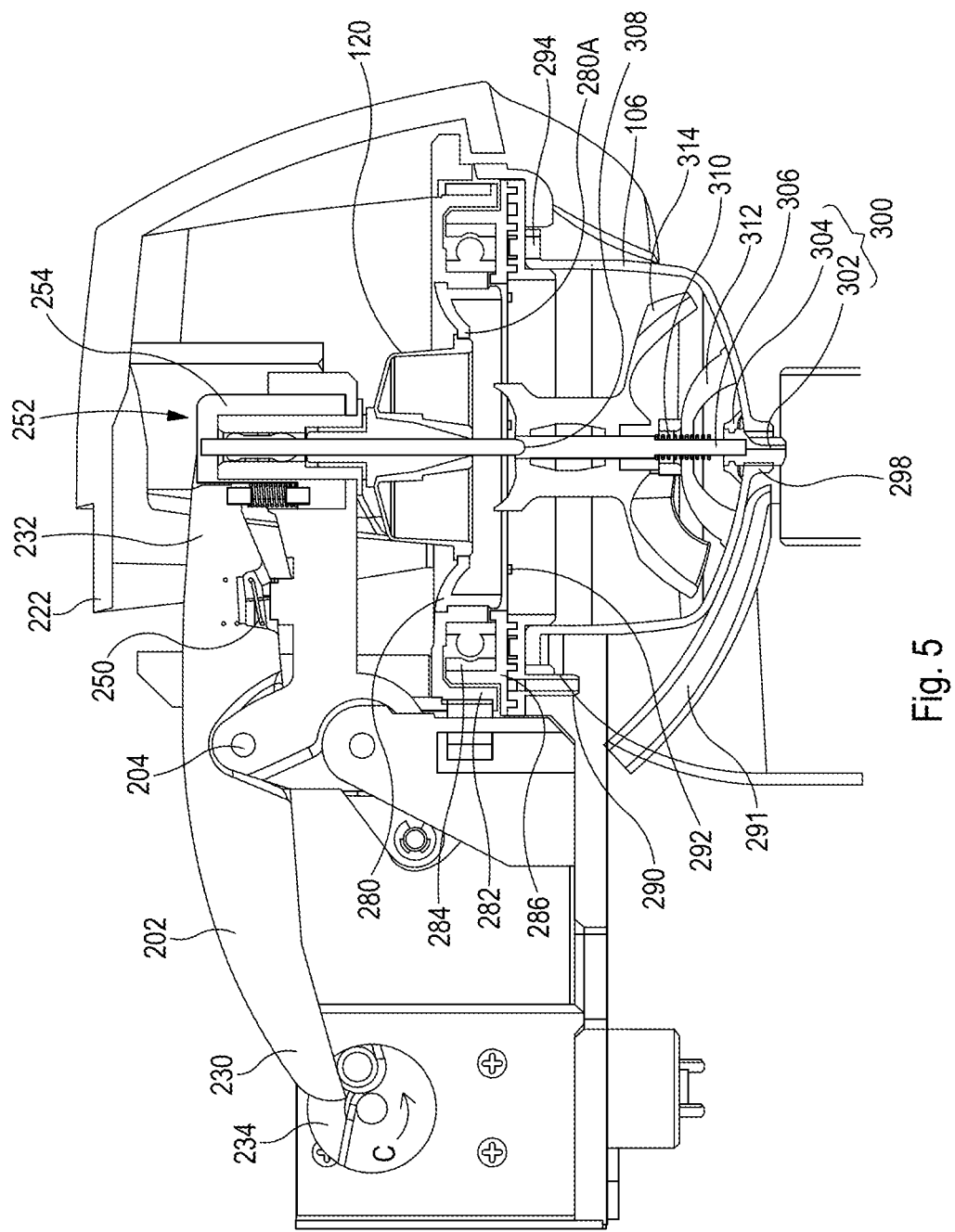
FIG. 5 shows a cross-section drawing of part of the beverage preparation apparatus shown in FIG. 1.

The rim 138 comprises a mounting flange 139 which extends around the perimeter of the rim 138 set back slightly from the open side 136. The mounting flange 139 provides a mounting surface facing downwards in the orientation shown in FIG. 2 which allows the pod 120 to be supported by a suitable support arrangement (e.g. as shown in FIG. 5), the rim 138 and flange 139 cooperating with the support arrangement to support the pod 120 in both horizontal and vertical directions (again, in the orientation shown in FIG. 2).

The body 122 also defines a central channel 140, passing from the closed side 134 to the open side 136. The pod 120 is generally rotationally symmetrical about an axis A-A', the central channel being co-axial with the axis A-A'. The central channel 140 is defined by channel walls 142 which are formed as part of the body 122, and which define a substantially frustoconical shape. The channel 140 has a first opening 144 provided at the centre of the closed side 134 of the pod 120, and a second, smaller, opening 146 provided at the open side 136 of the pod 120. In an embodiment, the first opening 144 may have a diameter of around 10 mm and the second opening 146 may have a diameter of around 3 mm.

The first opening 144 is a circular aperture defined by a transition region of the body 122 between the top 132 and the channel walls 142. The second opening 146 is also a circular aperture defined by a region 148 of the channel walls 142 having an increased thickness with respect to the remainder of the channel walls 142.

As described above, the film 126 is sealed to the rim 138 around the perimeter of the open side 136 of the pod 120. The film 126 is additionally sealed to the region 148 around the second opening 146. The film 126 may include a central hole which is aligned with the second opening 146. In this way the body 122 (comprising side walls 130, top walls 134 and channel walls 142) and the film 126 entirely enclose the cavity 128. It is noted, however, that in the illustrated embodiment, the cavity is toroidal, such that a path exists from the top to the bottom of the cavity through the channel 140 which path does not pass within the cavity, but which instead passes through the hole in the centre of the toroid.

The plunger 124 is disposed within the cavity 128. During a dispensing operation (as described in more detail below) the plunger 124 is configured to peel (or pierce) the film 126 so as to release the powder contained within the cavity 128.

The plunger comprises a hub portion 150 and a pusher portion 152, extending away and downwards (in the orientation of FIG. 2) from the hub 150. The hub portion 150 of the plunger 124 extends around the outward facing surface of the channel walls 142 (i.e. the surface that is within the cavity 128).

The channel walls 142 include abutment portions 154 which take the form of ribs which extend in a direction aligned to the central axis A-A' of the pod and which are provided around the central channel walls 142. The ribs engage with the hub portion 150 of the plunger 124. In particular, the end of each rib presents a downward facing surface which is configured to push against an upward facing surface provided by the top surface of the hub portion 150 of the plunger.

The body 122 may suitably be constructed from a thermoplastic polymer, such as, for example, polypropylene number 5. However, it will, of course, be appreciated that other polymeric or non-polymeric materials may also be used. The plunger 124 may suitably be constructed from a thermoplastic polymer. However, it will, of course, be appreciated that other polymeric or non-polymeric materials may also be used. Similarly, the film 126 may suitably be constructed from a thermoplastic polymer. However, it will, of course, be appreciated that other polymeric or non-polymeric materials may also be used. For example, the film 126 may suitably be constructed from a metal foil.

In some embodiments, the pod 120 may be formed from recyclable material, thereby avoiding the generation of waste which must be disposed of in land-fill. Alternatively, in some embodiments some, or even all, components of the pod (e.g. body 122, plunger 124, film 126) may be formed from biodegradable or compostable materials.

The dispensing assembly 104 is now described in more detail with reference to FIGS. 4 to 10. The dispensing assembly 104 comprises a mechanism for actuating the pod 120 in order to release the contents into the mixing chamber 106. The dispensing assembly 104 is supported by a base 200, which is part of a main body of the beverage dispenser 100, and which provides a fixed reference point for movement of components of the dispensing assembly 104. The dispensing assembly 104 comprises a motor driven linkage. More particularly, the dispensing assembly 104 comprises a pushing link 202 which is connected by a pivot 204 to a lower housing 206. The lower housing 206 is, in turn, pivotally connected to a support bracket 208 via a main pivot 210. The support bracket 208 is rigidly attached to the base 200.

The lower housing 206 includes a cover link arm 212 depending from the main pivot 210, which is connected, via a cover link arm pivot 214 to first end of a cover linkage 216. The cover linkage 216 is pivotally connected at a second end by cover linkage pivot 218 to a cover mounting bracket 220. A cover 222 is fixedly connected to the cover mounting bracket 220, e.g. via screws 224. The cover mounting bracket 220 is additionally connected by a cover pivot 226 to a forward portion 228 of the base 200.

Figure 4:
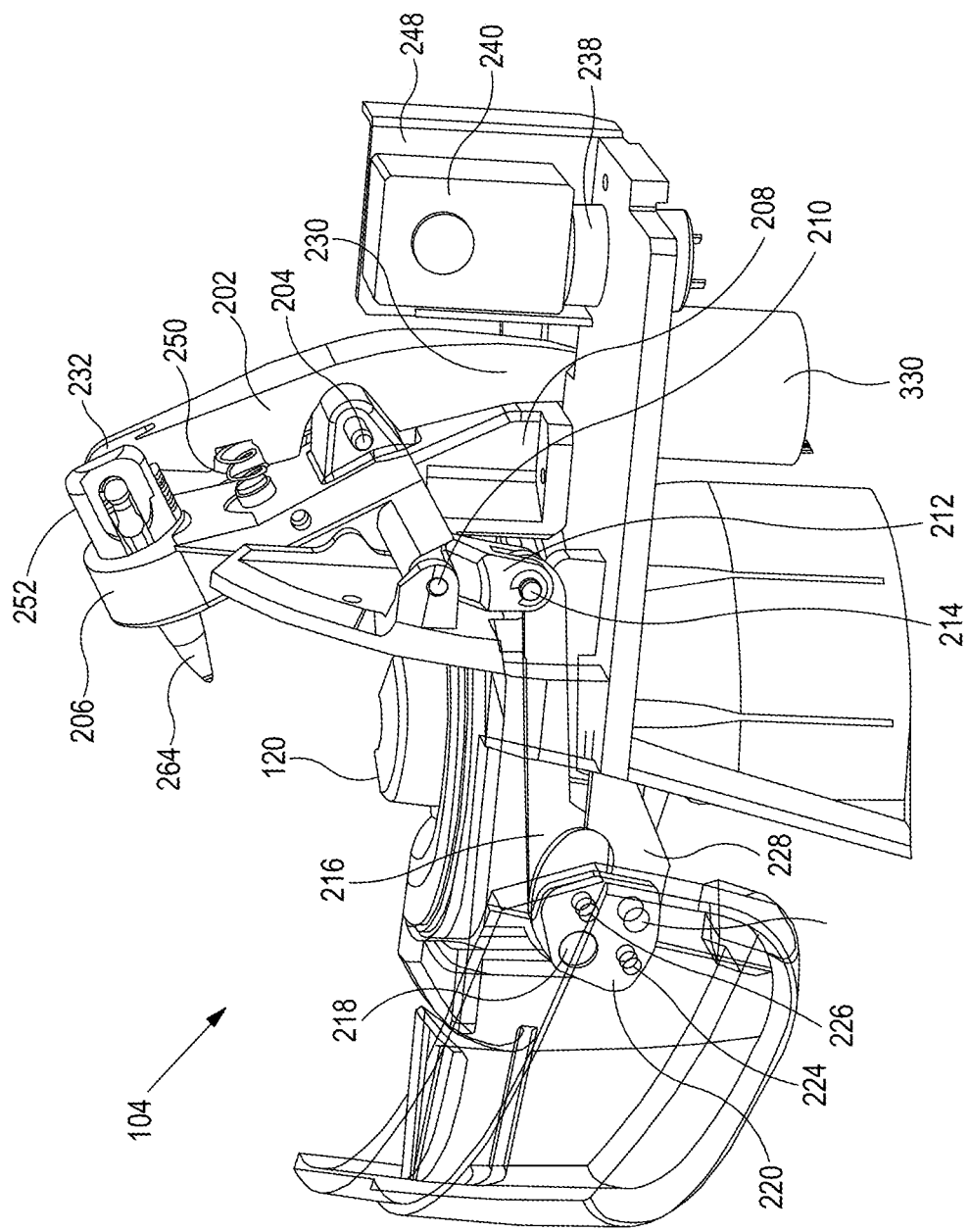
FIG. 4 shows a schematic drawing of part of the beverage preparation apparatus shown in FIG. 1.

As shown most clearly in FIG. 5, the pushing link 202 comprises a first end 230 and a second end 232. The pivot 204 is disposed generally centrally between the first and second ends 230, 232. The first end 230 of the pushing link 202 is configured to engage during operation with a cam 234, which is in turn driven by a motor 238. The motor 238 is coupled to the cam 234 by a gearbox 240 (which is shown in FIG. 4).

The motor 238 may, for example, comprise a motor having a low output speed (e.g. a no load speed of around 10 or 12 rpm) and large output torque (e.g. a stall torque of around 15 kgf·cm), and an operating voltage of 12 V DC. One such suitable motor may, for example, be a motor having part number TWG3246-370CA-15360-438 as manufactured by TT Motor (HK) Industrial Co. Ltd, Guangdong, China. Such a motor may incorporate a reducing gearbox. It will be appreciated that alternative motors may be used to provide a rotation of the pod. The motor may be selected based on its torque capacity and speed. A separate reducing gearbox may be used to adapt a motor output to provide a suitable output for driving the cam 234.

Figure 6:
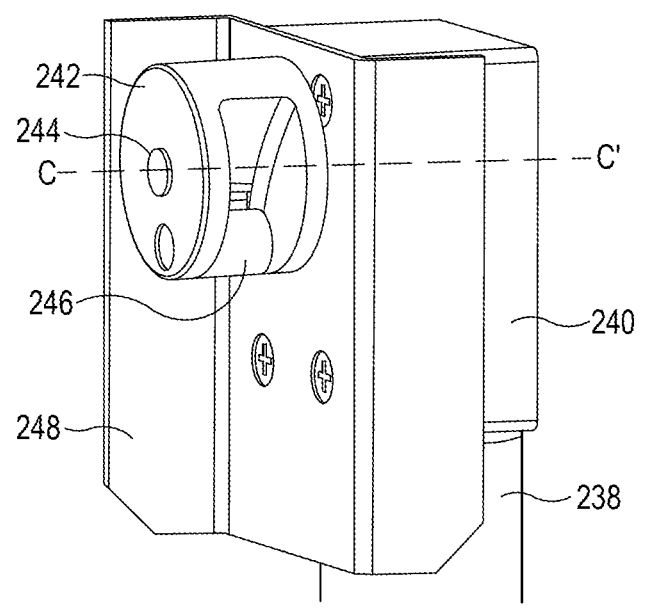
FIG. 6 shows a schematic drawing of part of the beverage preparation apparatus shown in FIG. 1.

The cam 234 comprises a crank housing 242, a magnet 244, and a roller 246, as shown in FIG. 6. The roller 246 is disposed within a cutaway portion of the crank housing 242 and is offset with respect to an axis C-C' of rotation of the cam 234 (which is central to the cam housing 242) such that when the crank housing 242 is caused to rotate about the axis C-C', the roller 246 is caused to move along a generally circular path with respect to the axis.

The magnet 244 is provided so as to enable an encoder (not shown) to monitor the rotation of the crank housing 242. The operation of the cam 234 is described in more detail below. The gearbox 240, motor 238, and cam 234 are supported by a bracket 248 which is in turn fixedly mounted to the base 200.

Referring again to FIG. 5, the pushing link 202 is further coupled to the lower housing 206 by a return spring 250. The return spring 250 is a compression spring which is disposed approximately mid-way between the pivot 204 and the second end 232 of the pushing link 202.

A cartridge assembly 252 is disposed at the second end 232 of the pushing link 202. The cartridge assembly 252 is now described in more detail with reference to FIG. 7b. The cartridge assembly 252 comprises a cartridge top 254, a push rod 256, a dog bone linkage 258, a cartridge top spring 260, an actuator sleeve 262 and an actuator 264. The dog bone linkage 258 and the actuator sleeve 262 are shown separately from the remaining components of the cartridge assembly in FIG. 7b.

The cartridge top 254 is coupled via the cartridge top spring 260 to the second end 232 of the pushing link 202. As such the cartridge top 254 generally moves with the second end 232 of the pushing link 202 unless external forces are applied which overcome the coupling effect of the spring 260. A lower end of the spring cartridge top 254 is disposed within a cavity 266 provided in an end of the lower housing 206. The cavity 266 is configured so as to allow the spring cartridge top 254 to slide up and down within the cavity in a vertical direction as shown in the configuration of FIG. 7a. The sliding motion of the spring cartridge 254 is generally aligned with an axis B-B' as shown in FIG. 7a.

The push rod 256 is attached to the cartridge top 254 and therefore also moves with the cartridge top 254 in a vertical direction along the axis B-B'. The push rod 256 is concentric with the axis B-B'. While coupled to the pushing link 202 by the spring 260, the cartridge top 254 also rests upon an upper end 258A of the dog bone linkage 258.

The dog bone linkage 258 provides a pivotal connection at the first end 258A to the second end 232 of the pushing link 202. The dog bone linkage 258 also comprises a second end 258B which is disposed below the first end 258A and which provides a sliding connection to the actuator sleeve 262. The actuator sleeve 262 is disposed within the cartridge top 254 and is itself configured to slide within the cartridge top 254 along the axis B-B'. The connections provided at the first and second ends 258A, 258B of the dog bone linkage 258 allow movement of the pushing link 202, and in particular the second end 232 of the pushing link 202, to be transmitted to the actuator sleeve 262. As can be seen most clearly in FIG. 7b, the second end 258B of the dog bone linkage 258 is configured to slide within a slot 262A provided by the sleeve 262. When the second end 258B reaches the lower end of the slot 262A (i.e. in the configuration shown in FIG. 7a), force is transmitted from the dog bone linkage 258 to the sleeve 262, driving the sleeve 262 in a downwards direction. On the other hand, when the first end 258A reaches the upper end of the slot 262A (i.e. in the configuration shown in FIG. 7b), force is transmitted from the dog bone linkage 258 to the sleeve 262, urging the sleeve 262 in an upwards direction.

The actuator sleeve 262 comprises a cylindrical portion which is generally received within the cartridge top 254, and a flange 268 which extends below the lower housing 206. The flange 268 prevents the actuator sleeve 262 from passing further upwards than the configuration shown in FIG. 7a where the flange 268 contacts the lower surface of the lower housing 206.

The coupling of the pushing link 202 to the actuator sleeve 262 via the dog bone linkage 258, in combination with the action of the return spring 250, results in the second end 232 of the pushing link 202 being urged away from the lower housing 206, thereby causing the flange 268 to be pressed against the lower surface of the lower housing 206. That is, the dog bone linkage 258 is caused to transmit a tension between the second end 232 of the pushing link 202, via the pivotal couplings, to the actuator sleeve 262. This is particularly so when the pushing link 202 is in a raised position, as shown in FIG. 8.

The actuator sleeve 262 further comprises a central bore through which the push rod 256 extends towards the lower end of the actuator sleeve 262 (i.e. the end comprising the flange 268). The central bore is enlarged at the lower end so as to receive an upper end 270 of the actuator 264. The upper end 270 comprises a generally cylindrical portion which is co-centric with the axis B-B'.

The actuator 264 further comprises a conically shaped pod engagement portion 272 having a first end 272A and a wider second end 272B which are configured to engage the channel 140 of the pod 120. A circumferential rib 274 is provided above (in the orientation shown in FIG. 7a) the wider end 272B of the pod engagement portion 272 and extends around the central axis B-B'. The pod engagement portion 272 of the actuator 264 is also concentric with the axis B-B'.

The actuator 264 also comprises a central bore configured to receive, and allow relative movement of, the push rod 256. The central bore extends along the axis B-B', and extends from the upper end 270 to the first end 272A of the pod engagement portion 272.

The actuator 264 is rotatable with respect to the actuator sleeve 262, with axial forces being coupled from the actuator sleeve 262 to the actuator 264 by a thrust bearing. The thrust bearing may be provided by a flanged sleeve bearing 275, provided between an upper surface of the circumferential rib 274 and a lower surface of the flange 268, with a sleeve of the bearing extending around the upper end 270 within the actuator sleeve 262.

Referring again to FIG. 5 the mixing chamber 106 and associated mixing and dispensing components are described in more detail. In use, the pod 120 is received by a pod support 280. The pod support 280 comprise a circular aperture for receiving the pod and provides a pod support region 280A by which the flange 139 of the pod is supported, as shown in the configuration of FIG. 5. When a pod is received in the pod support 280 it is positioned centrally with respect to the axis B-B', such that the central axis of the pod A-A' is co-linear with the axis B-B'.

The pod support 280 is itself supported by and received within an aperture provided in a mounting deck 282. The mounting deck 282 is rotatably supported by a bearing 284 so as to enable it to rotate about the axis B-B' with respect to a fixed support deck 286 which is fixedly connected to the base 200 of the dispensing device 100.

Of course it will be appreciated that any suitable bearing arrangement may be provided. For example a plain bearing surface may be provided rather than a roller bearing as indicated.

Referring now to FIG. 8, a rotation mechanism is provided to rotate the mounting deck 282. In particular, a motor 330 drives a toothed pulley gear 332 which in turn engages with a toothed belt 334. The toothed belt 334 extends around the rotatable support deck 282 which itself comprises an outer toothed surface for engagement with the belt. Thus, rotation of the motor 330 causes the mounting deck 282 to rotate about the axis B-B'. As described above, the mounting deck 282 is permitted to rotate with respect to the fixed support deck 286 by the bearing 284.

In an embodiment, the toothed pulley gear 332 may have 24 teeth, and the rotatable support deck 282 may have 110 teeth.

The motor 330 may, for example, be a motor having a maximum rated output speed of 1400 rpm, a nominal torque capacity of 0.8 kgf·cm, and operating on a 12 V DC supply. One such suitable motor may, for example, be a Motion King DC Motor having part number MK-G37-36-127500-5.8 as manufactured by MotionKing Motor Industry Co. Ltd, Jiangsu Province, China. It will be appreciated that alternative motors may be used to provide a rotation of the pod. The motor may be selected based on its torque capacity and speed. A reducing gearbox may be used to adapt a motor output to provide a suitable output for driving the pod support.

Referring again to FIG. 5, the mixing chamber 106 is also fixedly connected to the fixed support deck 286. A fluid inlet manifold 288 is also fixedly connected to the fixed mounting deck 286 and the mixing chamber 106.

Figures 9A, 9B:
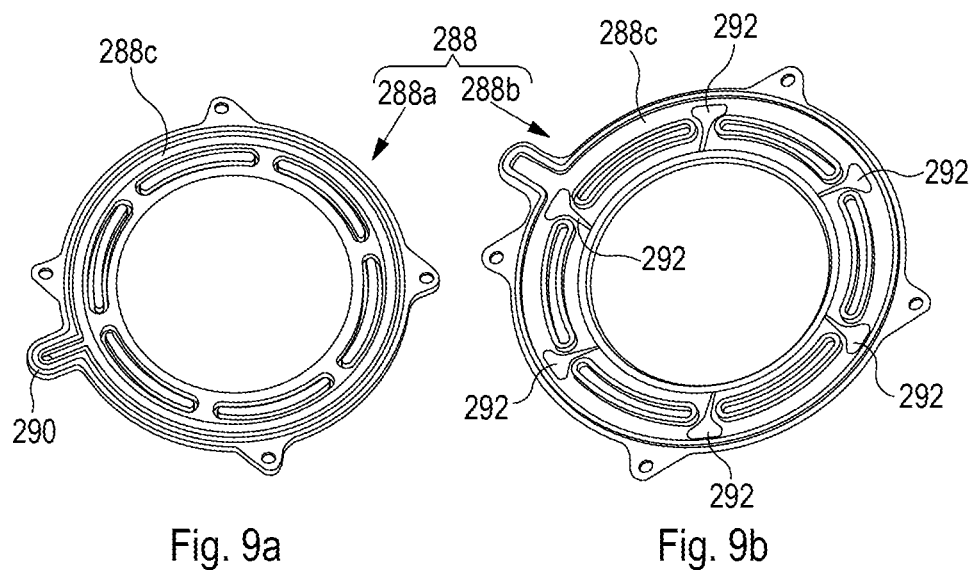
FIGS. 9a and 9b show perspective drawings of parts of the beverage preparation apparatus shown in FIG. 1.
Figure 10:
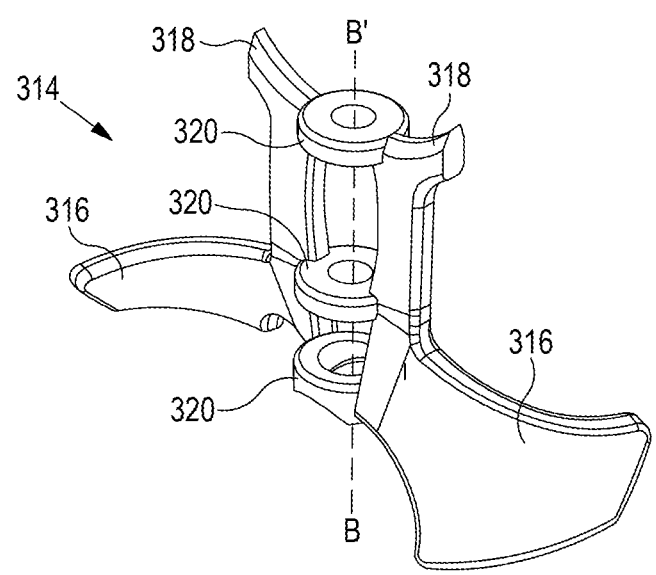
FIG. 10 shows a perspective drawing of a mixing paddle of the beverage preparation apparatus shown in FIG. 1.

The manifold 288 comprises an inlet pipe 290 and a plurality of outlet nozzles 292 disposed around an inner surface of the mixing chamber 106. That is the inlet manifold 288 comprises a number of fluid channels 288c which allow the fluid to pass from the inlet pipe 290 around the channels so as to be delivered to the outlet nozzles 292. In practice the channels may be formed between an upper portion 288b of the manifold (which is connected to the fixed mounting deck 286) and a surface of a lower portion 288a of the manifold which are pressed together in an assembled form. The structure of the manifold 288 is shown in more detail in FIGS. 9a and 9b. FIG. 9a shows the bottom portion 288a of the manifold 288, in which the inlet pipe 290 and water channels 288c can be seen. FIG. 9b shows the top portion 288b, in which water channels 288c and the nozzles 292 can be seen.

As shown in FIG. 5, the mixing chamber 106 comprises a mounting flange 294 which extends around the upper perimeter of the mixing chamber 106 defining an inlet opening to the mixing chamber 296. The mixing chamber also comprises an outlet 298 disposed at a lower end of the mixing chamber 106.

A make-up water outlet 291 is provided below the mixing chamber 106, to allow water to be dispensed into the vessel 110 without the water having passed through the mixing chamber 106.

The mixing chamber 106 also comprises a valve assembly 300 comprising a valve tip 302 and a sealing washer 304. The valve tip 302 may comprise channels such that when the valve tip 302 is partially inserted into the outlet 298 liquid may flow along the guide channels, so as to be guided from the mixing chamber 106 into the vessel 110. The valve assembly is disposed at the lower end of a valve rod 306. The valve rod 306 is concentric with the axis B-B', and has at its upper end a valve engagement feature 308 for engagement with a lower end of the push rod 256. The push rod 256 may be referred to as a valve actuator rod 256. The valve rod 306 is biased by a valve spring 310 which urges the valve rod 206 into a raised configuration when not pushed by the push rod 256. The spring 310 is attached at a first end to the valve rod 306 and at a second end to a support assembly 312, which is anchored to an internal surface of the mixing chamber 106.

The support assembly 312 also supports a mixing paddle 314 which is provided within the mixing chamber 106. The mixing paddle 314 comprises a plurality of mixing arms 316 and is shown in more detail in FIG. 10. The mixing paddle 314 further comprises two actuating arms 318 which extend towards the upper end of the mixing paddle for engagement with a drive mechanism. The mixing paddle 314 further comprises three centrally disposed mounting collars 320, each of which includes a central aperture for rotatable coupling to the valve rod 306. The central apertures are aligned with the axis B-B'. The mixing arms 316 extend away from, and are slightly curved with respect to a radius from, the axis B-B' prime. The mixing arms 316 have a profile when viewed side on in a plane including the axis B-B' which is generally shaped to correspond to the internal profile of the mixing chamber 106. The lower of the three mounting collars 320 is configured to rest upon and rotate with respect to the support structure 312.

In this way the paddle 314 is allowed to rotate about the axis B-B', but does not move vertically with respect to this axis. On the other hand, the valve rod 306 is configured to move vertically along the axis B-B', but does not rotate about the axis B-B'.

The operation of the dispensing apparatus 100 is now described in more detail. In use, the pod 120 described above is inserted into the dispensing apparatus 100 and opened depositing the contents of the pod (e.g. a powder comprising beverage preparation ingredients) into the mixing chamber 106, where the ingredients are mixed with a liquid (e.g. water) before being dispensed into a vessel 110 for consumption. The dispensing and mixing process comprise a number of sequential steps, many of which are performed substantially automatically by the apparatus 100.

The first sub-process of the mixing procedure is to load a pod 120 into the apparatus. This process is shown with reference to FIGS. 11a to 11c. In particular in FIG. 11a, the mixing apparatus 100 is shown in an open configuration. In the open configuration the cover 224 is tipped forward with respect to the base plate 200. In the open configuration the pod support 280 is accessible and the pod 120 can be placed onto the pod support 280 (as shown in FIG. 11a).

As described above, the cover 222 is mounted to the brackets 220 and pivots about pivot 226 with respect to the base 200 (as shown by arrow D1a). The cover linkage 216 is also connected to the bracket 220 at pivot 218 such that when the cover 222 (and attached components) rotates around the pivot 226, the attached linkage 216 is caused to move generally towards the left as shown in FIG. 11a (see arrow D1b). This movement causes the pivot 214 (which is attached to the right hand end of the linkage 216) to move to the left causing the lower housing 206 to pivot about the main pivot 210. This causes the lower housing 206 to rotate about the main pivot 210 in a generally clockwise direction in the orientation shown in FIG. 11a. It will be appreciated that given the connections (which are described in detail above) between the lower housing 206 and the pusher link 202, absent any external forces to cause relative movement between those components, the pusher link 202 and lower housing 206 will rotate as one about the main pivot 210 (see arrow D1c). This movement will cause the actuating member 264 to be raised, allowing easy access to the pod support region 280 for insertion of a pod 120.

Figure 11A:
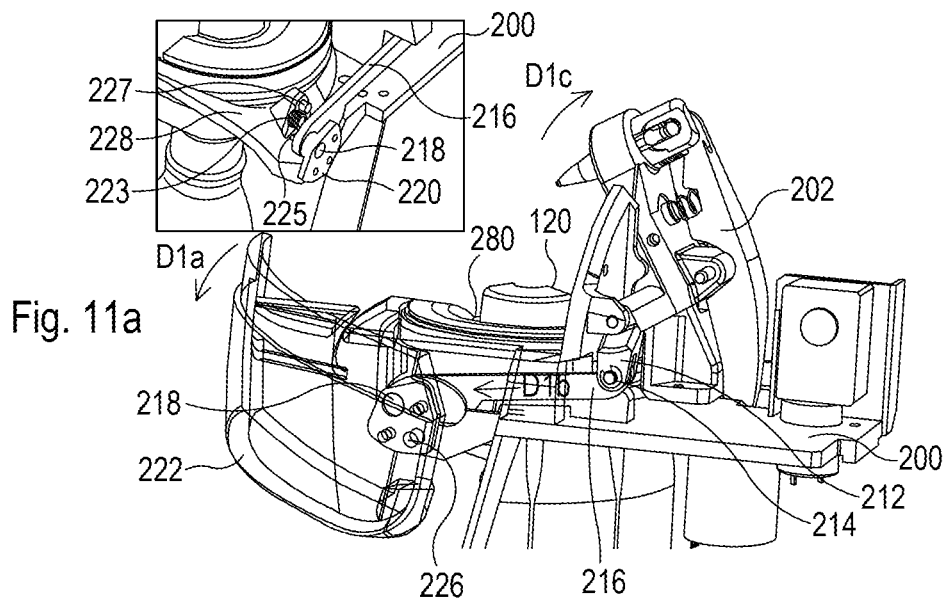
FIGS. 11a to 11c show schematic drawings of part of the beverage preparation apparatus shown in FIG. 1 in three different configurations.

As shown in the inset to FIG. 11a, a cover spring 223 may be provided to bias the cover 222 towards the open configuration. Spring mounting protrusions 225 and 227 may be provided on a part of the cover linkage 216 and a part of the base 228 respectively so as to ensure that when the cover 222 is open it remains in that position unless the bias force provided by the cover spring 223 is overcome.

Figure 11B:
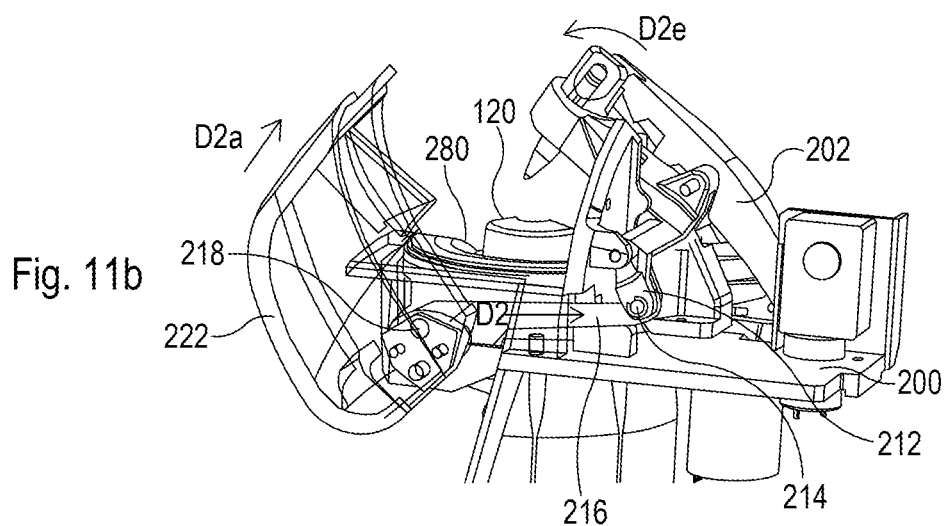

When the pod 120 has been inserted into the support region 280, the cover 222 can be closed by a user. The cover 222 is shown in a partially closed configuration in FIG. 11b. As the cover 222 is tilted backwards (clockwise about the pivot 226, as shown in FIG. 11b by arrow D2a) the cover linkage 216 is pushed to the right in as shown in FIG. 11b (see arrow D2b) causing the lower housing 206 and attached pusher link 202 to rotate about the main pivot 210. This causes the lower housing 206 and pusher link 202 to rotate in a generally anti-clockwise direction (see arrow D2c), lowering the actuator 264 towards the pod 120.

Figure 11C:
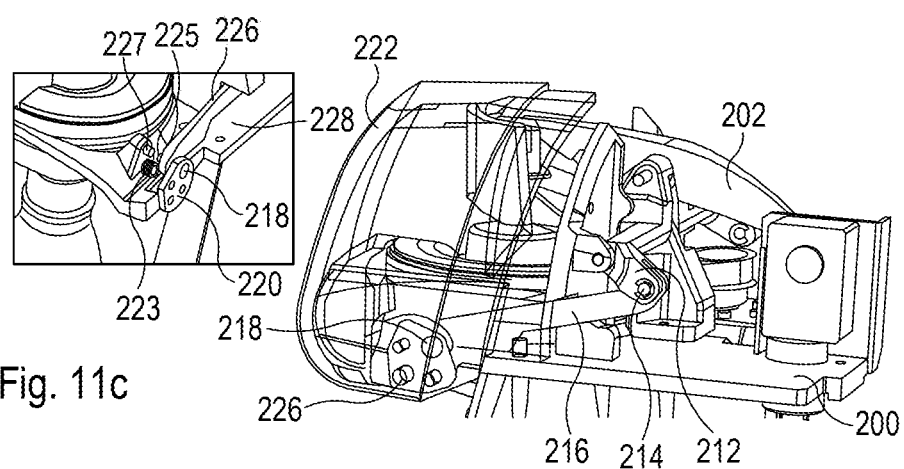

FIG. 11c shows the cover 222 in a closed configuration, in which the cover 222 has been rotated clockwise about the pivot 226 until it abuts a portion of the base 200 thereby stopping any further movement. The cover spring 223 provides an over-centre spring bias such that the cover 222 is retained in the closed configuration when it has been moved there by the user. The cover spring 223, and mounting protrusions 225 and 227 are configured such that the separation in the closed configuration (as shown in FIG. 11c) and, the configuration shown in the open configuration (as shown in FIG. 11a) are both such that when the cover is in either of those configurations the spring urges them further towards that configuration, rather than urging them towards the intermediate position shown in FIG. 11b.

The configuration of the protrusions 225, 227, when in the cover closed configuration is shown in the inset of FIG. 11c. It will be appreciated that alternative configurations may be used as appropriate, and an over-centre mechanism may be omitted entirely.

It will also be appreciated that the closing of the cover 222 as shown in FIG. 11c causes the lower housing 206 and pusher link 202 to move to a substantially horizontal configuration in which the actuator 264 is inserted into the channel 140 of the pod 120. When the cover 222 has been returned to the closed configuration the first end 230 of the pushing link 202 moves close to the cam 234, so as to enable the roller 246 to engage with the lower surface of the first end 230 of the pushing link 202.

It will also be understood therefore, that when the cover is to be opened and closed the cam 234 should be rotated to a position such that the roller 246 does not engage with the lower surface of the pushing link 202. In particular, if the cam 234 was rotated so as to cause the roller 246 to abut the lower surface of the pushing link 202 (e.g. as shown in FIG. 5), this would prevent the cover from 222 from opening due to the series of linkages described above.

The steps described above with reference to FIGS. 11a to 11c constitute a loading phase of the dispensing operation. A dispensing phase will now be described with reference to FIGS. 12a to 12c. During all parts of the dispensing phase, the cover 222 will remain closed (although is omitted from FIGS. 12a to 12c in the interests of clarity), and the lower housing 206 will remain in the same position relative to the base 200 that it arrived in during the closed configuration described above with reference to FIG. 11c (and also shown in FIG. 5). As such, for the purposes of the subsequent description of the dispensing phase, the lower housing 206 is essentially a fixed reference point relative to which other components may move.

Figure 12A:
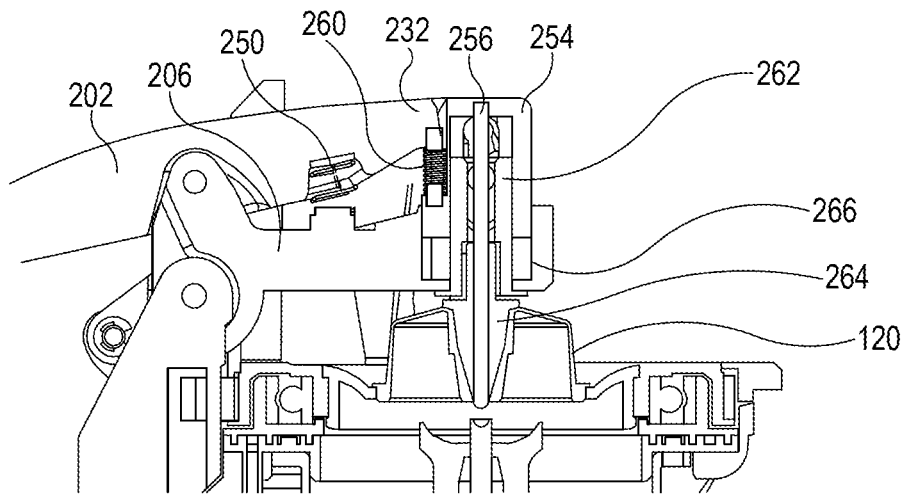
FIGS. 12a to 12c show cross-section drawings of part of the beverage preparation apparatus shown in FIG. 1 in three different configurations.

Starting from the closed configuration as shown in FIGS. 11c and 12a, the dispensing phase is started. The dispensing phase is initiated by motor 238 being rotated so as to cause the cam 234 to rotate. As described above with reference to FIG. 6, the cam 234 comprises crank housing 242 and roller 246. As the cam 234 rotates in an anticlockwise direction (as shown by the arrow C in FIG. 5), the roller 246 is caused to rise. As the roller 246 first makes contact with, and then urges upwards, the first end 230 of the pushing link 202, the link 202 is caused to rotate about the pivot 204. This movement causes the second end 232 of the pushing link 202 to move downwards.

Figure 12B:
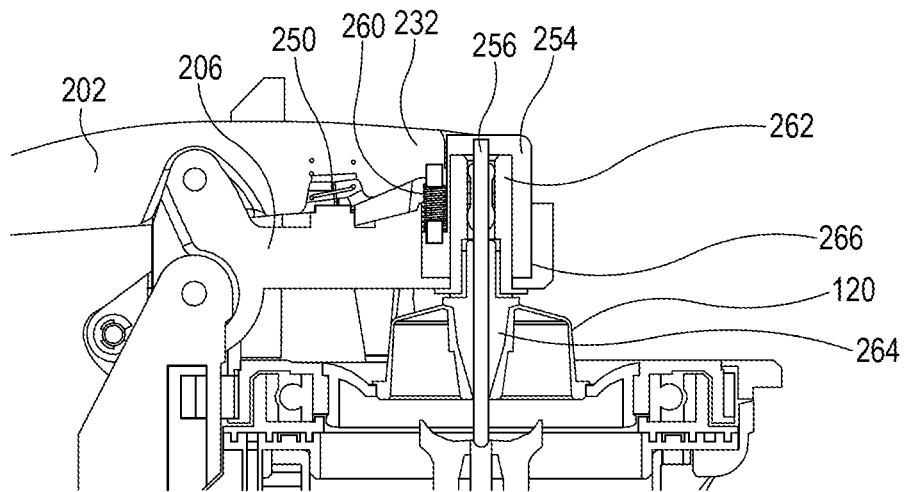

Moving from the cover closed position shown in FIG. 12a towards the configuration which is shown FIG. 12b it can be seen that the pusher link 202 has rotated with respect to the lower housing 206 causing the spring 250 to be compressed. It can also be seen that the cartridge top 254 (which is connected to the second end 232 of the link 202 via the spring 260) moves lower into the recess 266 provided within the lower housing 206. As shown in FIG. 12b the cartridge top 254 has moved down to the end of the recess 266 such that the lower end of the cartridge top 254 is in contact with the upper surface of the base of the recess 266. Furthermore, the pushing rod 256 which is connected to (and therefore moves with the cartridge top cover 254) has also moved downwards with respect to the lower housing 206. In fact, the pushing rod 256 has moved sufficiently that the lowest end of the pushing rod 256 is engaged with the engagement feature 308 provided in the valve actuating rod 306 (which is described above with reference to FIG. 7a).

As can be seen most clearly in FIG. 5, which shows the same configuration as in FIG. 12b, when the cam 234 has rotated so as to urge the first end 230 of the pushing link 202 in an upwards direction, the valve assembly 300 is caused to be pushed downwards thereby closing the outlet 298 of the mixing chamber 106. This configuration may be referred to as the plugged configuration. Whilst the apparatus is in the plugged configuration, water may be injected in to the mixing chamber via the nozzles 292 provided in the manifold 288. The pod may also be spun while in the plugged configuration. That is, the pod may be caused to spin from before the pod has been opened by the dispensing assembly 104, until after the contents have been evacuated.

Figure 12C:
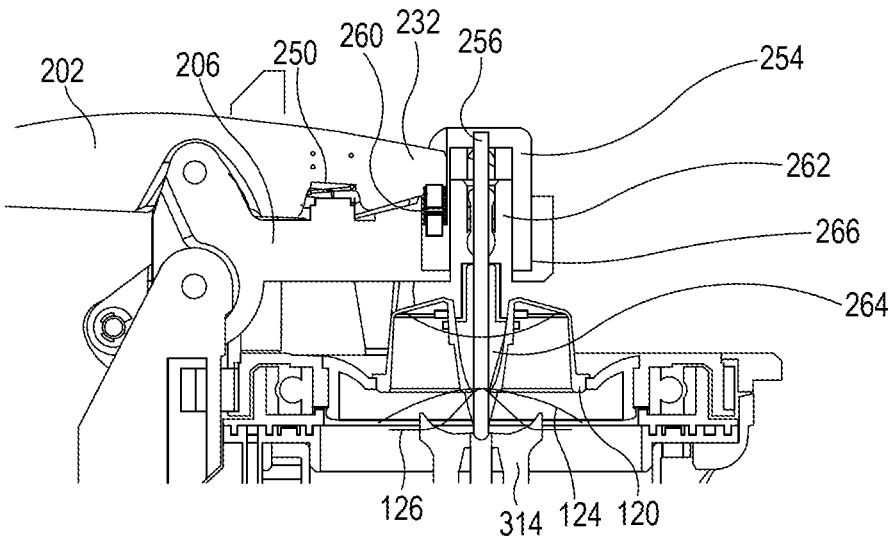

After reaching the plugged configuration, the dispensing phase continues with the cam 234 being rotated further in the anticlockwise direction (as shown in the orientation shown in FIGS. 5 and 7. This causes the pushing link 202 to be pivoted further about the pivot 204, causing the second end 232 of the pushing link 202 to be moved further downwards. This configuration is shown in FIG. 12c. In particular, it can be seen that the spring 260 which couples the pushing link 202 and the cartridge top 254 has been compressed since the cartridge top 254 cannot move further in a downwards direction due to the interference of the lower housing 206. However, since the pushing link 202 is forced to rotate further under the influence of the cam 234, the second end 232 of the link 202 is pushed further downwards causing the dog bone linkage 258 to move downwards, which in turn causes the actuator sleeve 262 to move downwards.

As can be seen in FIG. 12c, the flange 268 of the actuator sleeve 262 is caused to move away from the lower surface of the lower housing 206. This movement in turn causes the actuator 264, which is engaged with the pod 120, to be forced in a downwards direction along the axis B-B'. It will, however, be appreciated that given the fixed nature of the pod support 280 in the vertical direction, the pod flange 139 (which is supported by the pod support region 280A) does not move downwards, such that the pod 120 is caused to be deformed by the action of the actuator 264.

The effects of the actuation process on the pod 120 are described in more detail below with reference to FIGS. 14a and 14b. However, briefly the pod is actuated so as to cause the internal plunger mechanism (which is not shown in FIG. 12a or 12b) to be actuated, thereby causing the film 126 to be peeled away from the pod body 122 thereby releasing the pod contents into the mixing chamber 106. This configuration, which is shown in FIG. 12c, may be referred to as a pod-open configuration. It is noted that in FIG. 12c, the pod is shown in an un-deformed configuration. However, the position of the film 126, plunger 124 and top wall 132 are illustrated, as well as the position of the actuator 264 when the pod has been opened.

As briefly mentioned above, during the dispensing process some components of the dispensing apparatus are caused to rotate. In particular, as described above with reference to FIG. 8, the motor 330 is configured to cause the support deck 282 to rotate during the various steps of the dispensing phase so as to cause the contents of the pod to be released into the mixing chamber when the pod 120 is opened.

It will be understood that the dispensing process described with reference to FIGS. 12a to 12c may be carried out with or without rotation of the pod. However, in a preferred embodiment, the motor 330 is caused to rotate the mounting deck 282 and the pod support 280, so as to cause the supported pod 120 to also rotate about the axis B-B'. Given the close contact between the pod 120 and the actuator 264, the actuator portion will also rotate along with the pod 120. The thrust bearing 275 provided between the actuator 264 and the actuator sleeve 262 permits the actuator 264 to rotate relative to the actuator sleeve 262 (and other components of the spring cartridge assembly 252).

Once the pod 120 has been opened, and the water has been injected into the mixing chamber 106, the mixing paddle 314 is rotated so as to mix the pod contents with the water within the mixing chamber 106. During this process the outlet 298 of the mixing chamber 106 is plugged by the valve assembly 300. After a predetermined period of time the motor 238 is rotated so as to allow the pushing link 202 to return (under the influence of spring 250) to the closed configuration (as shown in FIG. 12a), allowing the pushing rod 256 to be lifted and allowing the valve assembly 300 to open the outlet 298 (under the influence of spring 310). As the valve 300 opens the mixed beverage contained within the mixing chamber 406 is allowed to drain from the mixing chamber through the outlet 298 towards the vessel 110.

During this process the pod body 122 will return to its normal shape. Moreover, given that the engagement arms 318 of the paddle 314 will no longer be engaged with the actuating portion of the pod 120, the paddle 314 and the pod 120 will become decoupled once again.

Once the primary mixing and dispensing process has been completed, as described above, the motor 238 may be once again rotated so as to cause the pushing link 202 to cause the valve assembly 300 to close again (i.e. to return to the plugged configuration shown in FIG. 12b) while the chamber 106 is rinsed. During this rinsing process more water may be added to the chamber 106 via the nozzles 292.

During this rinsing process it may be desired to rotate the paddle 314 once again. If so, the motor 238 is rotated further to cause the actuator 264 to once again deform the pod 120 (i.e. to return to the pod-open configuration shown in FIG. 12c), thereby causing the plunger 124 to engage with paddle 314 as described above. In this way, the rinsing water may be caused to splash around the internal parts of the chamber 106, thereby rinsing all surfaces clean.

After a rinse period, the motor 238 may once again be actuated so as to allow the chamber 106 be drained by opening the valve assembly 300. This opening of the valve assembly 300 allows the rinse water to drain into the vessel 110. The rotation of the spinning motor to 330 may then be stopped and the cover 222 opened to allow the pod 120 to be removed (the apparatus having first been returned to the closed configuration of FIGS. 11c/12a such that the cam 234 does not prevent opening of the cover 222).

As described above, the actuator 264 has a shape which is complimentary to that of central channel 140 of the pod 120. That is, the actuator 264 has a narrow end 272A, which has a similar diameter to the diameter of the opening 146, and a wide end 272B, which has a similar diameter to the diameter of the opening 144. Of course, it will be appreciated that different diameters and actuator shapes may be used. However, in general terms it can be understood that the actuator 264 is configured to engage with an actuator engagement region of the pod 120.

The operation of the pod will now be described in more detail, with reference to the pod structure described above with reference to FIGS. 2 and 3. In use, the actuator 264 is extended into the first opening 144 of the channel 140. The external surface of the pod engagement portion 272 of the actuator 264 engages with the internal surface of the walls 142 of the central channel 140. As the actuator 264 is driven downwards (in the orientation shown in FIGS. 12a-12c) the channel walls 142 are directly pushed by the pod engagement portion 272, causing the body 122 of the pod 120 to deform.

It will be understood that the deformation of the pod body 122 under the action of the actuator 264 causes the entire central channel region to be pushed downwards with relatively little deformation. On the other hand, the walls 130 are relatively stationary, due to their being supported by the dispensing apparatus 104 (by engagement of the flange 139 with the pod support region 280A of the dispensing apparatus). However, the top wall 134, which connects the side walls 130 to the channel walls 142, will deform allowing the channel walls 142 to move downwards (in the orientation shown in FIG. 2) relative to the side walls.

The hub portion 150 of the plunger 124 is pushed by abutment portions 154. This movement of the hub 150 causes the pusher portion 152 of the plunger 124 to move relative to the rim 138 of the side walls 130, and to be urged towards the film 126.

Figure 13:
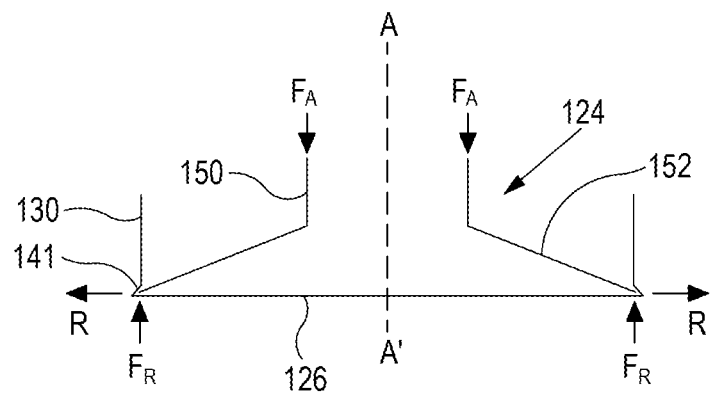
FIG. 13 shows a schematic drawing of part of the pod of FIG. 2.

As shown in a simplified manner in FIG. 13, the pusher portion 152 of the plunger 124 comprises a substantially conical 'skirt' that depends from the hub portion 150. During actuation forces $F_A$ are applied to the hub 150 in a direction which is generally aligned with the axis A-A'. These forces are resisted by reaction forces $F_R$ generated by contact with the film 126, which lies in a plane substantially perpendicular to the axis A-A' (and thus perpendicular to the direction of applied force $F_A$). It will be understood that due to the angle of the 'skirt', the application of the force $F_A$ will tend to cause the outer edge of the 'skirt' of the peeling portion 154 to expand, moving in a direction R. However, within the cavity 128 of the pod 120, the side walls 130, and in particular the rim 138, act to prevent such expansion of the 'skirt', focusing the force applied by the actuator 264 in the downward direction, so as to maximise the forces acting on the film 126. In order to improve the extent to which the forces acting on the plunger 124 are transferred to the film 126, the inner edge of the rim 138 is provided, in some embodiments, with a small bevelled region 141. The size of the bevel 141 may be selected so as to cooperate with the pusher portion 152. The bevelled region may be referred to as a chamfer.

In this way, forces are transmitted through the body 122 and the plunger 124 from the actuator 264 to the film 126. When the force exceeds a predetermined level, the film 126 will either tear or delaminate from the rim 138, opening the pod. The predetermined force may, for example, be in the region of 10-20 lbf (~44.5-89 N) input force applied by the actuator 264. Of course, the force requirement may be greater in some circumstances (e.g. 30 lbf/133 N, or above).

Of course, the way in which the film 126 is initially secured to the rim 138 will also influence the way in which the film 126 can be removed, and the force required to open the pod.

For example, it the film is securely bonded (e.g. by thermal welding) such that the bond is at least as strong as the film material, then the film may be more likely shear than to peel from the rim 138. On the other hand, the bond may be made weaker than the film 126, so as to promote peeling. In some embodiments, the film 126 may be bonded to the rib 138 by an adhesive. The film may be attached to the region of increased thickness 148 by a similar process to that used to attach the film 126 to the rim 138.

Moreover, the distance through which the actuator 264 may be required to travel in order to open the pod 120 may, for example, be around 2.5 mm. That is, the dispensing apparatus may be required to deliver an actuating force of approximately the magnitude described above while moving through a distance of around 2.5 mm. An additional actuator travel distance of around 6 mm may be provided prior to the actuation of the pod so as to allow the pushing rod 256 to pass through the opening 146, and to further pass through the film 126 which may be arranged to cover the opening 146. The film 126 may be provided with a cut (e.g. a cross-cut) at the centre of the opening 146 to permit such movement of the rod 256 to engage with the valve assembly 300. This initial movement (e.g. 6 mm of travel) may cause the pod to be clamped in position, and the valve assembly 300 to be closed. This initial movement generally corresponds to the movement which causes the change between the configurations shown in FIGS. 12a and 12b. The subsequent movement (e.g. 2.5 mm of travel) may cause the pod to be opened. This movement generally corresponds to the movement which causes the change between the configurations shown in FIGS. 12b and 12c. It will, of course, be understood that these movement distances may be varied depending upon the pod design and apparatus configuration.

In order to deliver the output force described above, the motor 238 may generate an output torque of around 7.15 kgf·cm. Of course, the motor output required to generate a given opening force will depend upon the gearing and mechanical couplings provided between the motor 238 and the actuator 264.

It will be understood that the pusher portion 152 is the only part of the plunger 124 that contacts the film 126. As such, while the pusher portion 152 causes the film 126 to peel away from the rim 136 of the capsule walls 130, the central part of the film 126 will remain adhered to the region of increased thickness 148 of the channel walls 142 even after the film seal around the peripheral rim 138 has been broken.

Figure 14A:
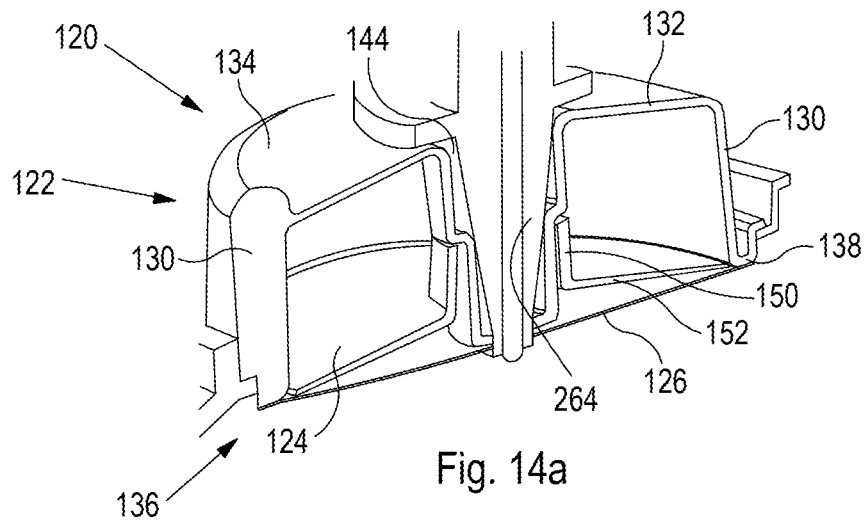
FIGS. 14a and 14b show a cross-sectional perspective view of the pod of FIG. 2 in closed and open configurations respectively.
Figure 14B:
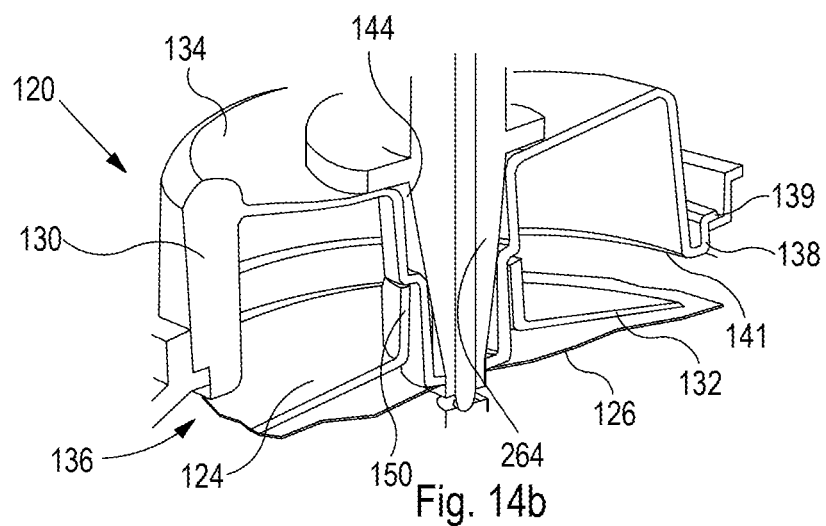

FIGS. 14a and 14b show the pod in a closed and open configuration respectively. In the closed configured shown in FIG. 14a, the actuator 264 is in contact with, but has not yet deformed the body 122. The top wall 132 slopes slightly upwards from a low point around the perimeter of the closed side 134 at the join between the side walls 130 and the top walls 132 to a high point around the opening 144. The perimeter of the pusher portion 152 can be seen resting against the inner surface of the film 126.

In the open configuration shown in FIG. 14b, the actuator 264 has been moved in a downwards direction such that the top wall 132 has been deformed as described above, and the walls 142 have been displaced downwards by an amount that corresponds to the movement of the actuator 264.

The plunger 124 has also been displaced downwards by a similar amount causing the film 126 to be peeled (or torn) from the rim 138, opening the pod 120, and allowing the powder contained therein to be related through the opening under the influence of gravity. That is, during dispensing, the pod is oriented such that the open side 136 is generally lower than the closed side 134.

It can be seen that, once opened, any beverage preparation ingredient contained within the pod 120 can be released around the entire perimeter of the open side 136 without any interruption (e.g. a protrusion such as a lip, ridge, rib, or ledge). Moreover, the gradually tapering sides of the pod 120 ensure that the diameter of the opening formed is at least as large as the internal width of the pod. This means that there are no corners formed around the internal surface of the side walls that could trap the beverage preparation ingredient. This is especially so when the pod is rotated during dispensing (since the contents will be urged towards the side walls and could easily become trapped by a protrusion).

It can be seen that the film 126 remains attached to the portion 148 of the channel walls 142 around the opening 146, and thus is retained at least partially in contact with the pod body 122.

Figure 15:
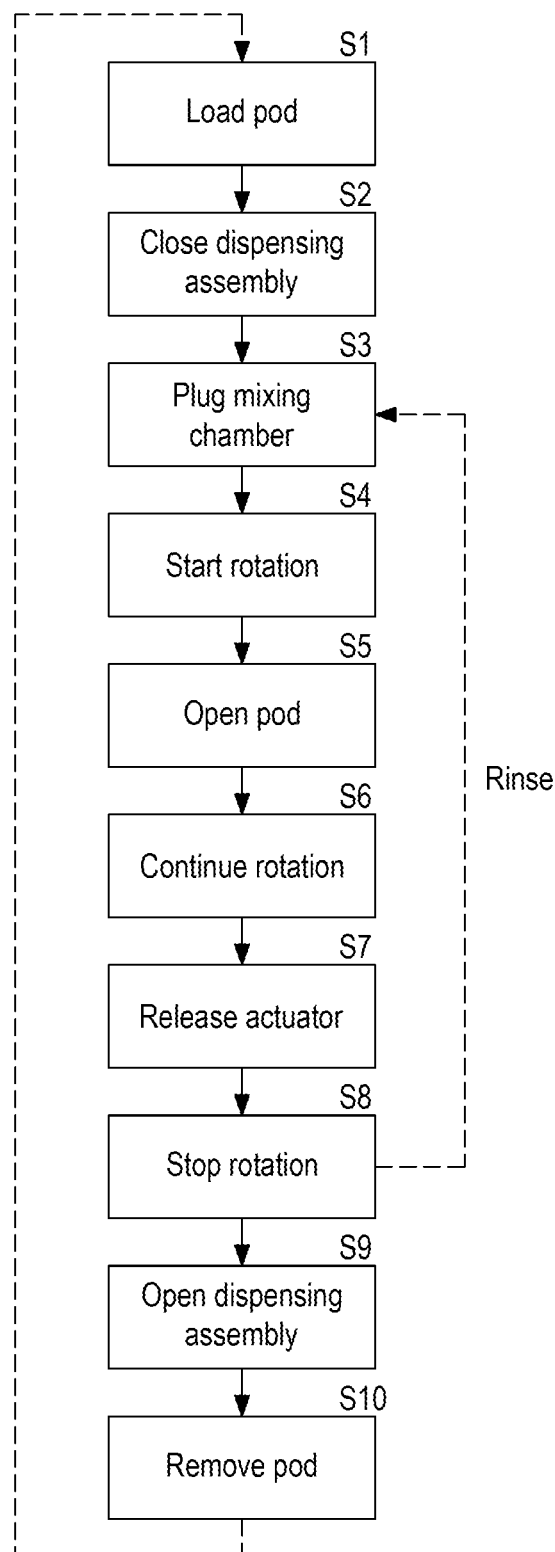
FIG. 15 shows a flow chart of a method of operating the beverage preparation apparatus shown in FIG. 1.

FIG. 15 schematically illustrates the various beverage preparation steps described above. The dispensing process will now be summarised with reference to FIG. 15. At step S1 (which corresponds to the open configuration shown in FIG. 11a), a pod is loaded into the dispensing assembly 104. At step S2, the cover 222 is closed, causing the actuator 264 to be lowered towards the pod 120 (which configuration corresponds to the closed configuration shown in FIG. 11c). At step S3, the actuator 264 is lowered so as to engage with the pod 120, clamping the pod in place (although not yet opening the film 126), and plugging the mixing chamber outlet 298. This corresponds to the configuration shown in FIG. 12b. At step S4, the pod is rotated.

At step S5, the actuator assembly is driven further, causing the pod to be opened (while the pod is still rotated). This corresponds to the configuration shown in FIG. 13c. At step S6 (which directly follows step S5), the pod is rotated for a predetermined duration so as to ensure that pod contents are fully evacuated from the pod.

The pod may be caused to rotate at at least a minimum predetermined rotation speed. The minimum predetermined rotation speed may, for example, be around 200 revolutions per minute. A minimum speed may be preferred so as to ensure that the contents of the pod are urged towards and out of the opening by centrifugal forces created by the rotation. The rotation speed may, for example be in the region of 200-600 revolutions per minute, and may be selected on the basis of empirical studies.

In an embodiment, the rotation speed may, for example, be around 500 revolutions per minute, which, using a gear ratio as described above (i.e. toothed pulley gear 332 having 24 teeth, rotatable support deck 282 having 110 teeth) would require a motor rotational speed of 2292 revolutions per minute for the motor 330.

The torque required to be generated by the motor 330 (or a gearbox driven by the motor) to spin the pod 120 and mixing paddle 314 may, for example, be around 0.150 kgf·cm. Of course, if the pod is also required to be spun during the opening process described above, increased resistance will be encountered by the motor 330, In such an arrangement, the motor gearbox output required to spin the pod 120 and mixing paddle 314 during opening may, for example, be around 1 kgf·cm. It will, of course, be appreciated that these forces will vary in dependence upon many factors (e.g. bearing friction). A suitable motor drive arrangement may be determined by trial and error.

At step S7 the actuator is partially raised (to the FIG. 12a configuration), allowing the pod to return to the un-deformed shape, allowing the mixing chamber to drain into the vessel. At step S8, the pod rotation is stopped. At step S9, the actuator 264 is raised out of contact with and away from the pod, returning to the open configuration shown in FIG. 11a, such that the pod can be removed. At step S10 the used pod is removed, and the dispensing cycle can restart from step S1 if required.

An optional rinsing process may be performed by returning from step S8 to step S3 (although no further ingredients will be released at step S5). Such a rinsing process may be performed more than once if required.

Further, during step S6, the rotation speed may be varied (and even briefly stopped and re-started) to promote complete evacuation and/or improved mixing.

As described above, the pod contents are evacuated by way of an opening being formed, allowing the contents to fall out under the influence of gravity, assisted by rotation. In particular, centrifugal forces generated by the rotation of the pod cause the powder to be pushed away from the central axis A-A' and through the opening between the lower surface of the rim 138 and the upper surface of the pusher portion 152. It will be understood, therefore, that during a dispensing cycle (and in particular steps S5 and S6) the pod is preferably orientated such that the open side 136 is generally lower than the closed side 134.

Of course, it will be appreciated that there is no requirement that the pod axis A-A' is strictly vertically oriented. This is especially so given the use of rotation to evacuate the pod, since at some point during each rotation of the pod when the axis A-A' is not vertically aligned, every part of the opening will be at the bottom, allowing the contents to be effectively evacuated.

Similarly, while not essential, in the described embodiment the axis A-A' is co-linear with the axis B-B', such that the pod is caused to spin about its own central axis. This may be beneficial for providing even distribution of the powder within the pod when spun before it is dispensed, and effective release of the powder from the pod when it is opened.

Further, the spinning of the pod before it is opened is also not essential, but may be beneficial for a number of reasons. For example, such pre-spinning may cause the pod contents to be distributed to the pod walls, so as to be close to the opening once it is formed. Similarly, spinning during and immediately after the opening process will cause the pod contents to be released from the pod as quickly as possible, and will also prevent water (which may be injected into the mixing chamber during pod opening) which may splash into the pod or onto the pod film from causing the pod contents to stick to the pod. Rather, any water incident on pod surfaces will immediately be flung outwards and back onto the mixing chamber walls.

During the dispensing cycling described above there is no requirement for water to be used to purge the pod contents. That is, in contrast to many known pod-based beverage dispensing devices, there is no requirement for water to be provided into the pod so as to mix with the pod contents and exit as a partial y mixed beverage. Rather, in the system of the present invention, the pod contents are evacuated whilst dry, and are only mixed with water in a mixing chamber external to the pod. In this way, the pod remains dry at all times, and does not becoming sticky, with a partially dissolved drink residue, and does not require excessive water to rinse the pod clean during a dispensing cycle.

Moreover, the rotation of the pod during the dispensing cycle provides an efficient mechanism for evacuating the dry powder from the cavity. This, in combination with the absence of water (meaning that the powder does not become sticky) provides a reliable dispensing mechanism for controlled doses of beverage preparation ingredients.

This operating mechanism provides further significant advantages over known systems since the used pod can be removed from the apparatus and disposed of without presenting a hygiene problem. The complete evacuation of the pods without any external component penetrating the pod ensures that there are no external penetrating components which need to be cleaned between dispensing operations, or which could cause cross-contamination between successive dispensing cycles. Thus, the internal plunger provides a convenient opening mechanism, which limits the extent to which external components need to be cleaned for re-use.

Moreover, the dry empty pods ensure that the risk of cross-contamination between used pod and new pods can be minimised.

Further, the use of a relatively smooth mixing chamber allows straight forward cleaning (e.g. by rinsing as described above), and minimises the potential for residue to build up within the mixing chamber.

It will be understood that the forces required to open the pod, as described above, may be significant. Moreover, the above described actuating mechanism is provided by a compact device, so as to enable the apparatus 100 to remain relatively short, and without requiring significant space above the device in use. For example, in some embodiments the overall apparatus height may be less than around 460 mm (around 18 inches) so as to enable the apparatus to fit underneath a standard above-counter top cabinet. While it may have been simpler to provide the actuation force by virtue of a long manually actuated lever, the use of a motor driven linkage assembly (incorporating the pushing link 202) ensures that the actuation force is generated by components within the apparatus, rather than requiring significant space to be left for the manual operation of a long lever. Further, the use of an automatically actuated actuation assembly reduces the likelihood of miss-use, which could lead to breakage (especially where significant forces are required to be applied by a user).

The compact motor operated dispensing assembly 104 also allows the dispensing outlet (i.e. the outlet 298 from the mixing chamber 106) to be raised to such a height that relatively tall bottles or glasses can be provided beneath the outlet 298. That is, a standard 500 ml bottle may be placed beneath the outlet 298 in order to receive the mixed beverage. It will, of course, be appreciated that simultaneously providing a dispensing apparatus which can accommodate a 500 ml bottle, while also not rising above a total height of around 460 mm places significant constraints on the design of the dispensing apparatus. However by use of a motor driven linkage assembly, the above described apparatus enables high actuating forces to be generated, while still complying with the above described space constraints.

Of course, it will be appreciated that it is not essential for a full height bottle of around 330 mm (around 13 inches) to be accommodated, or the total height not to exceed 460 mm. However, by meeting both of these targets, a more convenient user experience can be provided. Indeed, in some embodiments the apparatus may be configured or optimised to receive smaller sized bottles or drinking vessels, such as those having a height of around 250 mm (around 10 inches).

Furthermore, the above described linkage assembly, which provides firstly for an automatically actuated pod, and also a manually opened cover, provides a convenient and simple to use apparatus. In particular, if the cover 222 was to be opened by the same mechanism as is used to deliver the actuating force, the same motor would be required to provide a high force during actuation, while also moving the cover through a significant distance to provide direct access to the pod mounting area for loading and unloading.

However, by providing the cover linkage as described above, the pusher link can be caused to move by the movement of the cover through a first angular distance (e.g. by rotating through around 80 degrees about the main pivot 210) while experiencing very little resistance (i.e. from the open configuration shown in FIG. 11*a* to the closed configuration shown in FIG. 11*c*), and then caused to move through a relatively small second angular distance (e.g. by rotating about the pivot 204 through around 10 degrees) while experiencing significant resistance (i.e. from the closed configuration to the pod-open configuration) by the action of the motor.

It will, of course, be understood that various modifications to the above described embodiments may be made.

For example, the actuator and the pod both may have any appropriate configuration and may not be exactly as described above. For example, the actuator can take any convenient form that permits engagement with a pod in such a way as to cause the pod to be opened. Generally speaking the actuator may include a driving surface (e.g. the outer surface of the above described conical actuator) which is configured to engage with an appropriately configured driven surface of the pod.

For example, the pod need not have a central channel which extends from the closed side to the open side of the pod. Rather the pod may include any feature which permits an actuator to cause an internal member to form an opening in the open side. For example, the internal member (e.g. the plunger 124) may comprise a central hub which extends to the top wall/closed side of the pod, such that a force applied by an actuator to a substantially flat upper surface of the top wall can cause the plunger to open the pod. Many other variations can also be envisioned.

Figure 3:
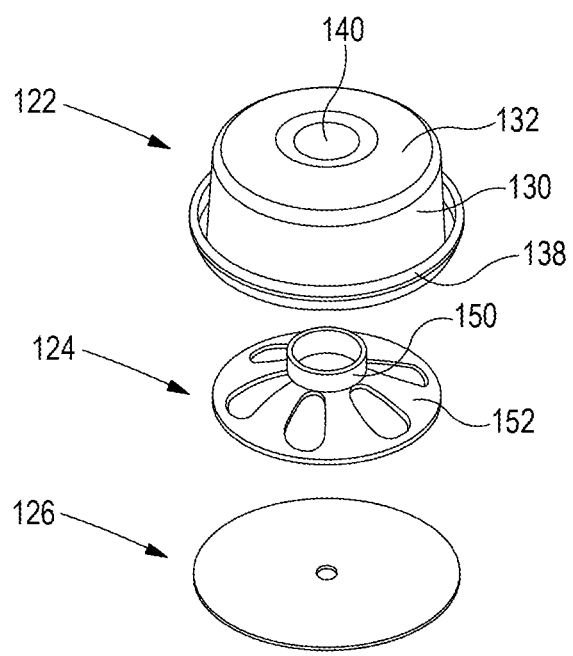
FIG. 3 shows an exploded perspective view of the pod of FIG. 2.
Figure 16:
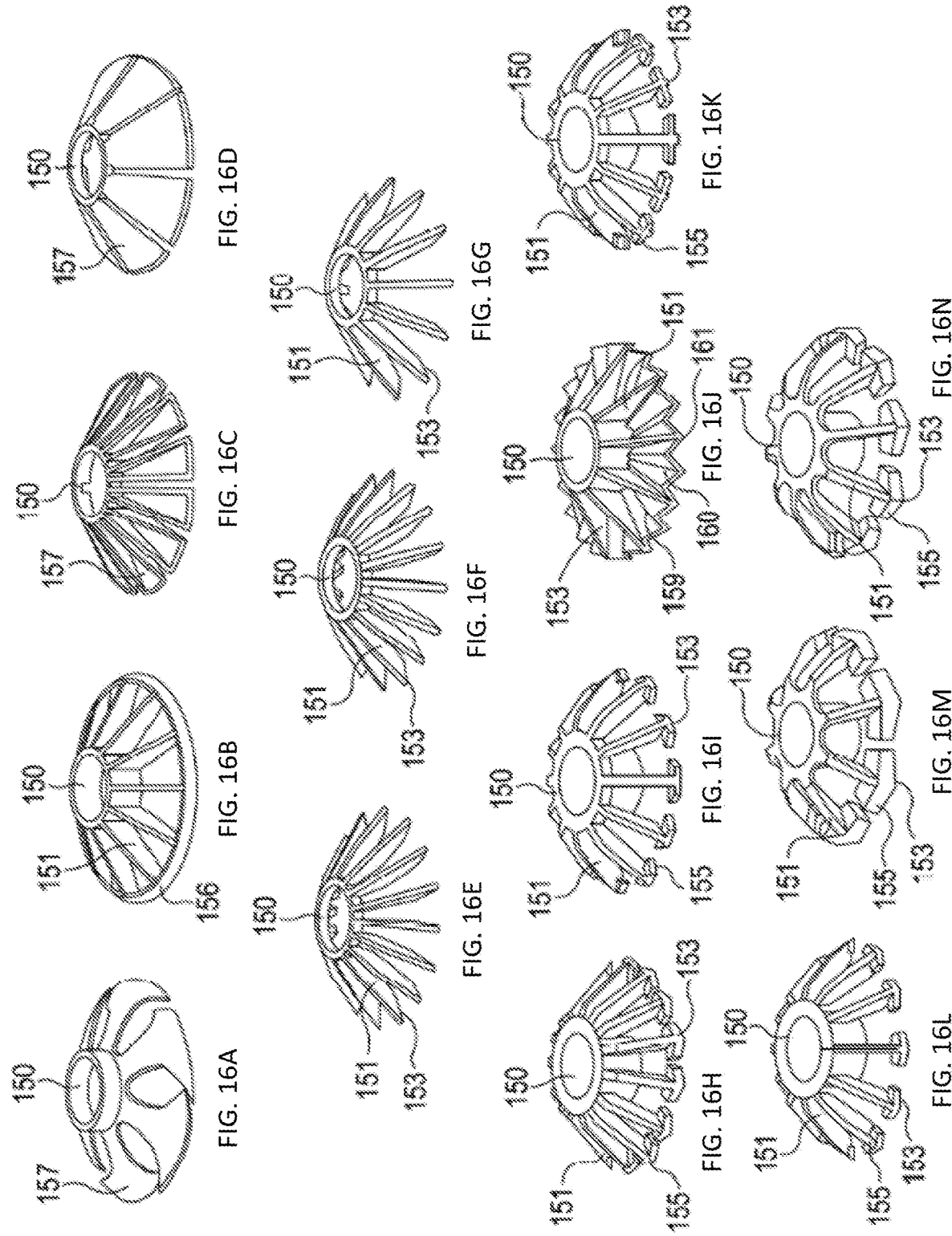
FIGS. 16A through 16N show perspective views of alternative versions of part of the pod of FIG. 2.

Similarly, while FIGS. 2 and 3 show one particular embodiment of the plunger 124, a wide variety of different plunger configurations may be used. Several such examples are shown in FIGS. 16A-16N.

In each case, a central hub 150 is provided which engages with the abutment portions 154 of the channel walls 142. However, the pusher portion 152 may take on a variety of different forms.

For example, in some embodiments, the pusher portion 152 may comprise a plurality of radial ribs 151 which extend from the hub 150 towards the rim 138. In some such embodiments, each rib may terminate in a respective tip 153, which is configured to press against the film 126. Such an arrangement can be seen in the examples of FIGS. 16E, 16F, and 16G, each of which include 12-14 ribs 151.

In some embodiments each rib 151 terminates in an enlarged bulge 155, providing an increased contact area with the film, thereby distributing the force applied by the peeling portion over a larger area, so as to promote peeling of the film 126 (rather than shearing or tearing). Such an arrangement can be seen in the examples of FIGS. 16H, 16I, 16K, and 16L, which include 12-16 ribs 151, each having an enlarged end bulge 155.

Alternatively, in some embodiments the tips 153 may comprise a sharpened region or point, providing a reduced initial contact area with the film 126, thereby concentrating the force applied by the peeling portion over a small area, promoting tearing or shearing of the film 126 inside the rim 138, rather than peeling away from the rim 138. Such an arrangement can be seen in the examples of FIGS. 16M and 16N, which include 8 and 10 ribs 151 respectively, each of which has an enlarged end plate 155 with a sharpened tip 153.

In further alternative embodiments, the ribs may all terminate in a single peripheral rim 156, which is configured to press against the film 126, while distributing the force evenly around the perimeter of the film 126. Such an arrangement can be seen in the example of FIG. 16B, which includes 12 ribs 151 connected to a single rim.

In yet further alternative embodiments, the pusher portion 152 may comprise a plurality of radial plates 157 which extend from the hub 150 towards the rim 138. Each plate may define a segment of a conical surface with relatively small gaps provided between each plate. In such an arrangement the plates 157 may cooperate to press against the film 126 such that the force transmitted through the pusher portion 152 is distributed substantially evenly around the perimeter of the film 126. Such an arrangement can be seen in the examples of FIGS. 16A, 16C, and 16D.

In a yet further alternative embodiment (e.g. the example of FIG. 16J), the pusher portion 152 may comprise a ridged structure 158 having a plurality of radially extending ridges 159 and corresponding troughs 160 extending away from the central hub 150. At the furthest radial extent of each of the troughs a sharp corner 161 is formed which provides a force concentration point. The force concentration points are optimised to promote tearing or shearing of the film 126 inside the rim 138, rather than peeling away from the rim 138. Reinforcing ribs 151 may be provided between the hub 150 and the peeling portion, so as to limit the extent to which the perimeter of the peeling portion flexes upwards (relative to the hub 150) when significant force is being transmitted between the hub 150 and the pusher portion 152.

It will, of course be appreciated that different plunger arrangements may also be provided which may include combinations of features shown in various ones of the examples of FIGS. 16A to 16N described above, as well as other, non-shown embodiments.

Generally speaking, the plunger is configured to cause the pod to open by tearing (shearing) or delamination (peeling) the film 126. It will, of course, be understood that the term 'pusher portion' is intended to refer to embodiments which tend to cause tearing or which tend to cause peeling of the film 126. The plungers are caused operate by the action of force exceeding a minimum predetermined actuation force being applied by the actuator 264 to the channel walls 142, via the abutment portions 154 to the plunger 124, the force eventually being transmitted to the internal surface of the film 126.

It will also be appreciated that various alternatives to the above described dispensing apparatus can be envisaged. For example, in some alternative embodiments, the actuator may comprise a dispensing pipe which allows water to be passed through the channel 140 and directly into the mixing chamber 106 while bypassing the pod 120 entirely. In one such alternative embodiment, a water inlet may be provided integrally with the pod actuator and, in use, is co-axial with the pod axis A-A' and actuation assembly axis B-B'. For example, the push rod 256 may comprise a hollow pipe having one or more nozzles disposed around sides of the pipe bottom.

In other embodiments, the central pod channel 140 can be used to permit various forms of mechanical coupling to be established between the dispensing assembly 104 and components of the mixing chamber separately from the pod. For example, in an embodiment, the actuator may comprise a drive shaft which passes through the channel 140 and engages with drive features of a mixing mechanism provided within the mixing chamber. The drive shaft may transmit rotation to the mixing mechanism so as to cause the beverage to be mixed within the mixing chamber. Such rotation may be different to the rotation of the pod.

Alternatively, rotation may be transmitted to the mixing mechanism by a part of the pod 120 itself other than the plunger 124. For example the pod may include an engagement feature, for example around the opening 146, to engage with the mixing mechanism. In use, whilst the pod is actuated by the actuator 264, the engagement feature may be driven towards the mixing mechanism so as to engage the mixing mechanism. Then, during rotation of the pod, the mixing mechanism may be caused to rotate by the rotation transmitted via the pod 120, causing the beverage to be mixed within the mixing chamber.

Of course, alternative mixing mechanisms are also possible. For example, the entire mixing chamber may be coupled to the pod so as to rotate with the pod 120. Alternatively, a mixing paddle may be provided within the mixing chamber which is driven by other means (e.g. mechanically, or by magnetic coupling with components provided outside the mixing chamber).

In some embodiments, the valve assembly 300 (and associated push rod 256) may be omitted. In an embodiment, rotation of the mixing paddle causes the mixed beverage to remain within the mixing chamber without the need for any additional seal. Alternatively, the mixing chamber itself may rotate, thereby keeping the mixed beverage within the mixing chamber. Once the rotation stops, the beverage will be allowed to drain from the mixing chamber via the outlet 298.

Moreover, in the above described embodiments, the pod (and possibly chamber) rotation caused by use of an electric motor provided within the beverage preparation apparatus 100. However, this rotation could also be achieved by alternative means, such as, for example, by a small portable manual device.

In a yet further alternative embodiment, rather than a motor driven linkage being used to actuate the pod, alternative actuation mechanisms may be used. For example, a manual actuating arm may be lowered to clamp the pod in place. Then, a solenoid operated release mechanism may be used to open the pod, the manual arm having been used to pre-load a spring which is configured to deliver the actuating force.

It will be understood that while the above described embodiment causes the pod to spin about the axis B-B' that is concentric with the central axis of the pod A-A', in some embodiments it may be preferred to cause the pod to spin about another axis.

Similarly, while in the above described embodiment the pod is caused to spin before it is opened, this is not required. In particular in some embodiments, the pod may be opened before it is caused to spin.

Generally speaking, it will be appreciated that a pod of the general sort described above may be operated in combination with any suitable actuating mechanism which is configured to provide an appropriate actuating force, and an appropriate rotation.

Where terms such as 'about', 'generally', 'substantially' are used herein, it is not intended that the precise details are required to be used. Rather, some variation or tolerance (especially to numerical values) may be used. Of course, it will also be understood that where an example is provided, and is described with such terms of variation, the actual value or configuration described may be used in a preferred embodiment.

Similarly, by fixedly connected, it is meant that, in use, there is not expected to be any significant movement (e.g. lateral or rotational movement) between the components referred to. Of course, during assembly, cleaning, or maintenance operations, such components may be moved or separated as required.

While the invention has been illustrated and described in detail in the drawings and foregoing description, the same is to be considered as illustrative and not restrictive in character, it being understood that only the preferred embodiments have been shown and described and that all changes, equivalents, and modifications that come within the scope or spirit of the inventions defined by following claims are desired to be protected. It is also contemplated that structures and features embodied in the present examples can be altered, rearranged, substituted, deleted, duplicated, combined and added to each other. The articles "the", "a", and "and" are not necessarily limited to mean only one, but rather are inclusive and open-ended so as to include optionally multiple such elements.

The following description provides further information relating to some embodiments of the present disclosure, and describes a system and method for chilling liquids. It will be appreciated that this features described below can be combined with features of the disclosure set out above, as well as being considered separately to that set out above.

A conventional system of chilling liquids such as water includes a refrigeration cycle device, typically having a compressor and expansion chamber, which requires large components that make noise and heat.

An alternative is a Peltier device, an example of which is shown in FIG. 17. The Peltier device shown in FIG. 17 is a 40×40×3 mm Peltier thermoelectric device. This type of device is often used in low cost water coolers and is generally arranged to have the cold side of the solid state Peltier attached to an extruded aluminum finned element that projects into the water chamber. When the device is powered by low voltage source (12 VDC typically) the 'cold side' of the device conducts its thermal gradient to the extrusion and then the water gets cooled by convective effects in the water tank. The hot side of the device is connected to a large heatsink which is in turn attached to a fan that dissipated the heat into the surrounding air by a continuous flow of ambient air over the heatsink ribs.

FIGS. 18a and 18b show a photograph and schematic cutaway view of a standard water chill block 402 which might be used in combination with the Peltier device 400 shown in FIG. 17. FIG. 19 shows a cutaway view of a standard chiller tank 404 using a Peltier TE cooler in which a hot side and cold side heat exchangers are coupled to the Peltier cooling element. FIG. 20 shows further cutaway and complete standard chiller tanks using a Peltier TE cooler.

The described embodiments pertain to systems and methods of cooling liquids such as water using a Thermoelectric 'Peltier' solid state device. These embodiments are particularly well suited for incorporation into a drink making machine.

The new method proposed is based on a combination of needs:
  A need to remove the water tank to refill it without making electrical connections
  A water tank that does not have a metal finned component inside it
  A water system that is cooled homogeneously via a pumped water system to avoid a thermal gradient inside the water tank Water that is continuously filtered through a disposable carbon element so that over a period of time the water is stripped of impurities and dissolved chemicals.

Figure 21:
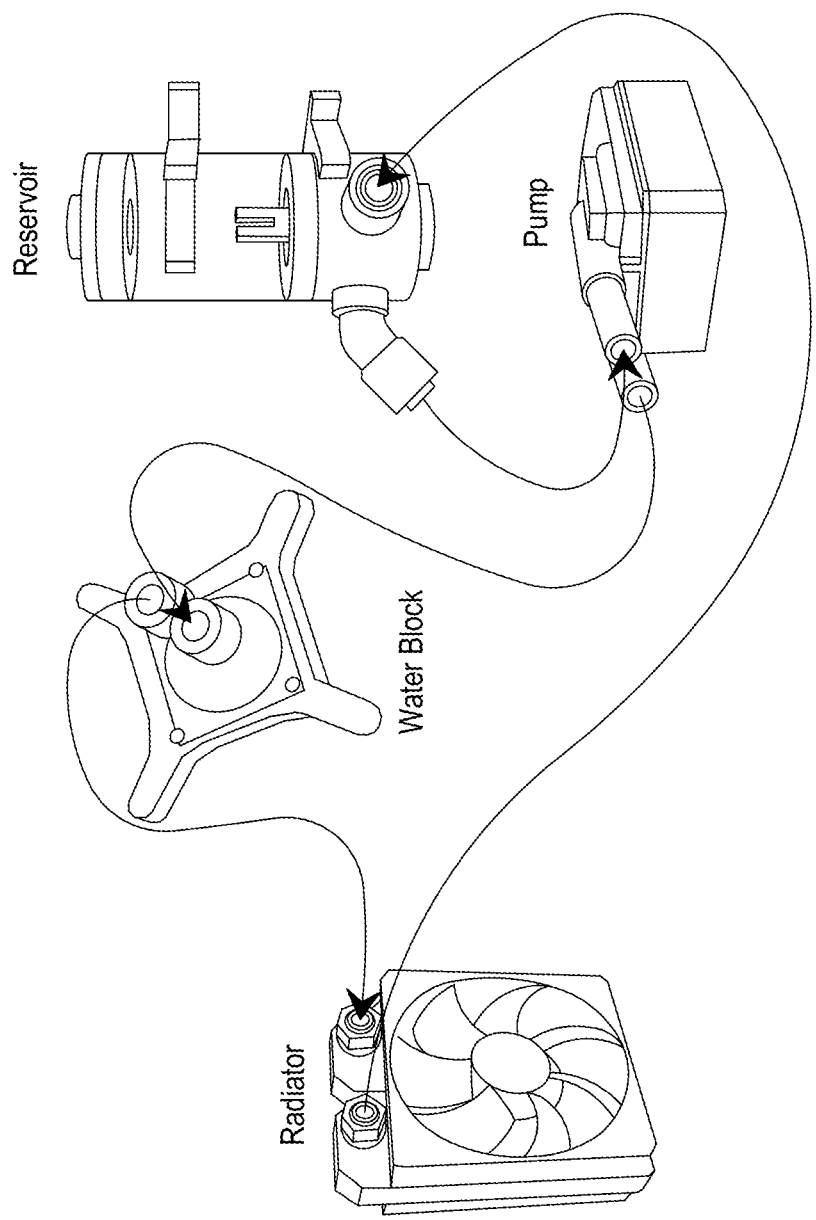
FIG. 21 shows images of a computer processor cooling system.

The method makes use of a water chiller block commonly used in computers to cool the main processor chip. In this case the normal use is to pump water through the chiller block labyrinth and then cool that pumped water via a radiator and fan system. FIG. 21 shows images of a computer processor cooling system.

Figure 22:
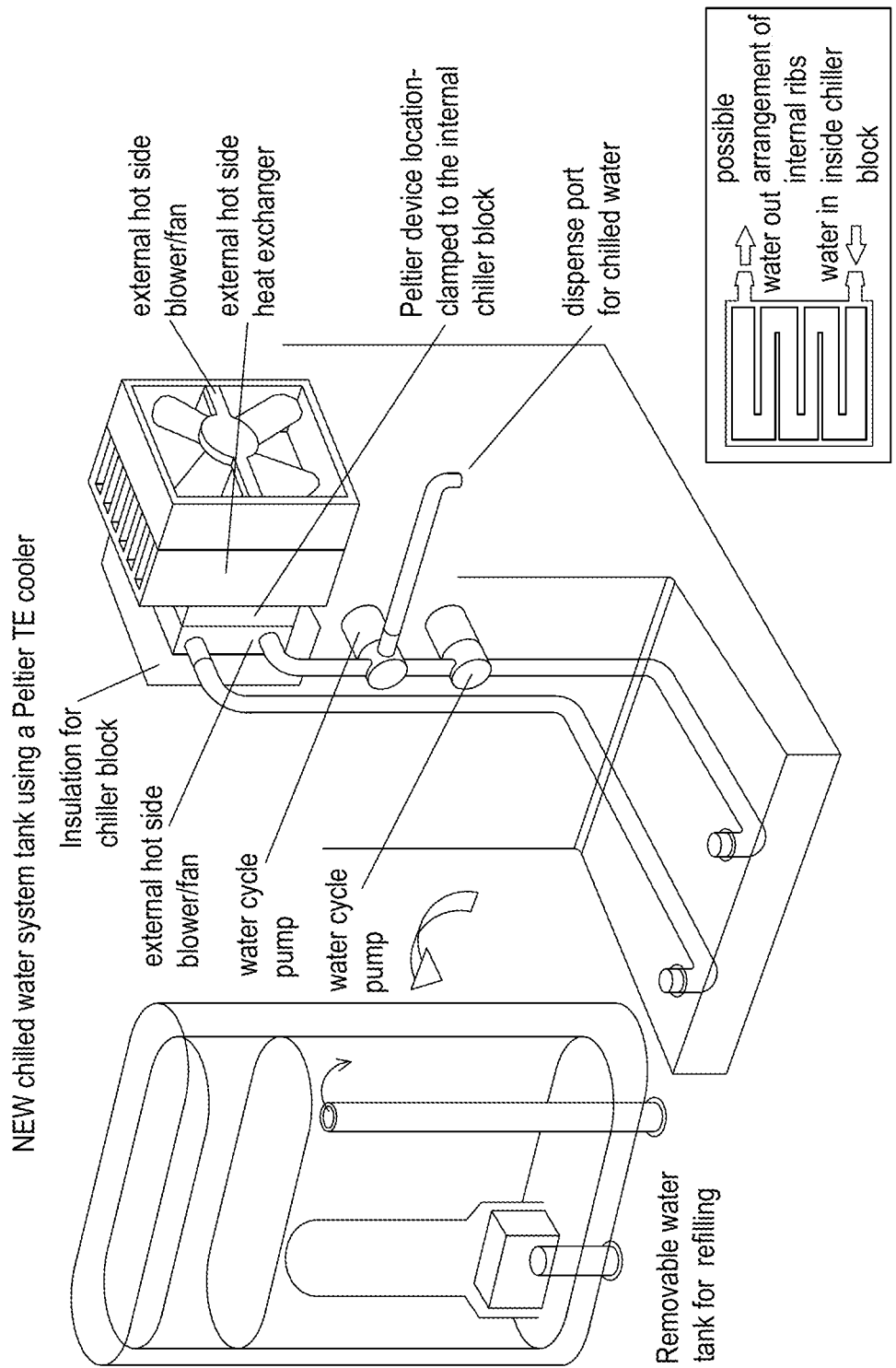
FIG. 22 shows a schematic view of a chilled water system.
Figure 23:
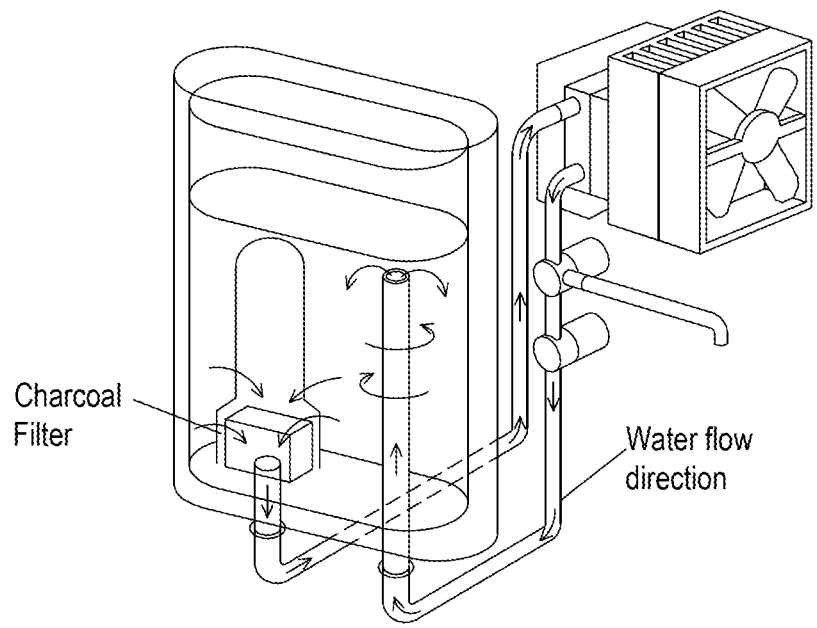
FIG. 23 shows another schematic view of a chilled water system.
Figure 24:
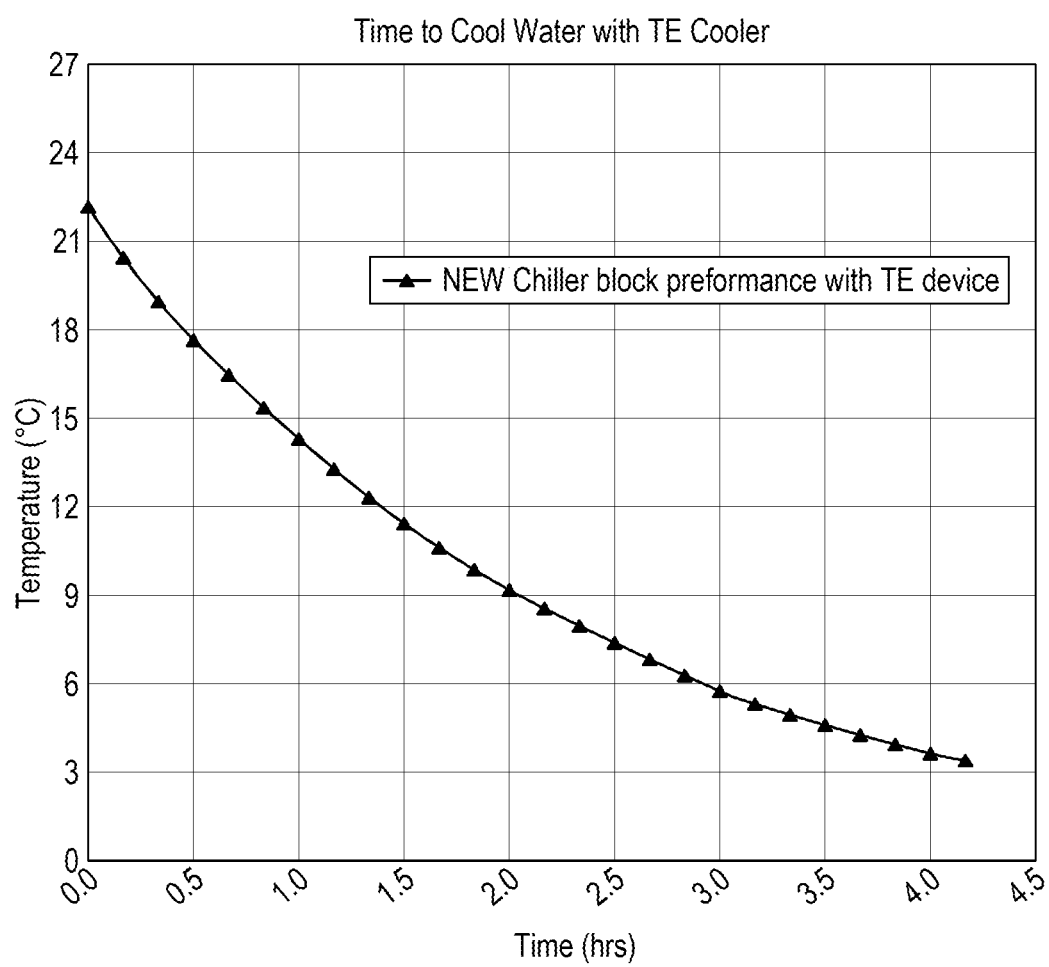
FIG. 24 shows the time taken to cool water with a cooler.
Figure 25:
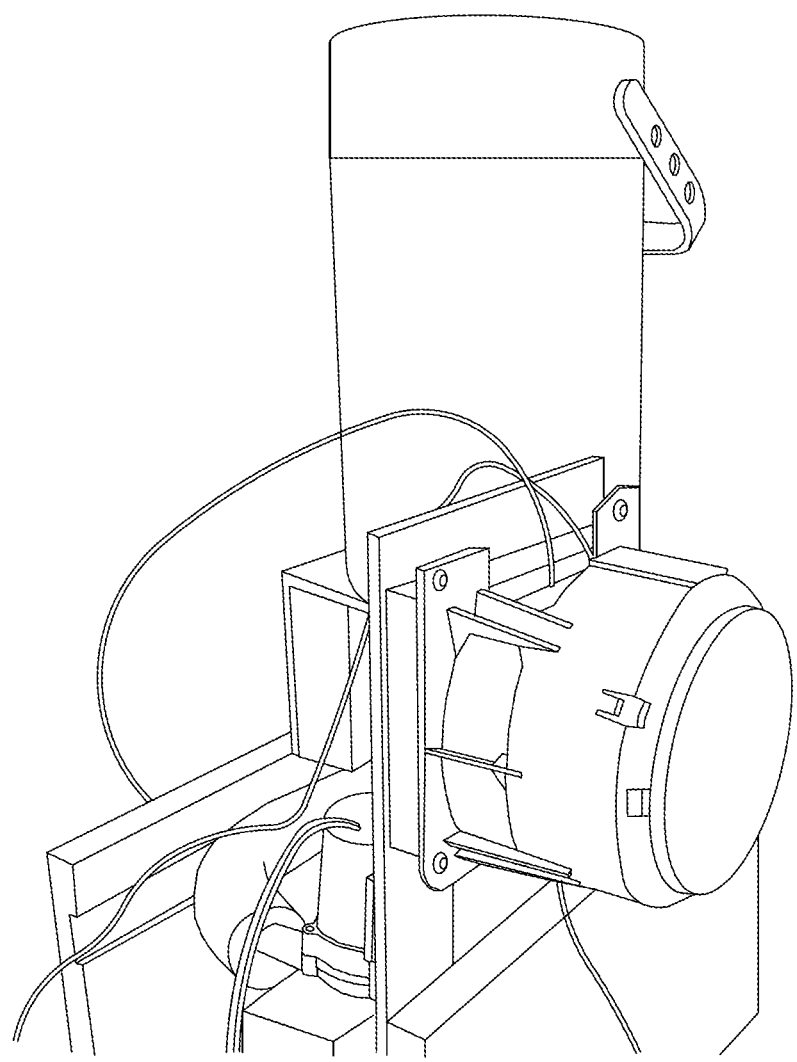
FIG. 25 shows a test assembly.
Figure 26A:
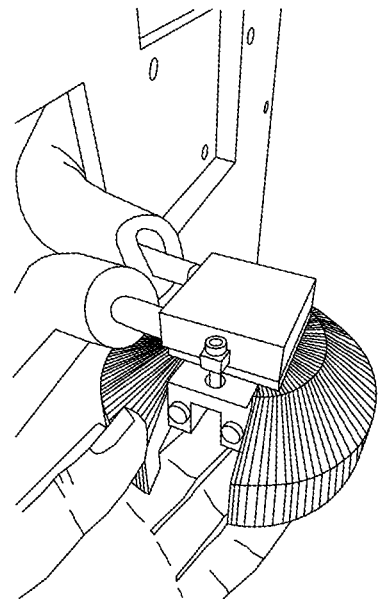
FIGS. 26a to 26d show pictures of a heat sink, fan, blower and chiller block.
Figure 26B:
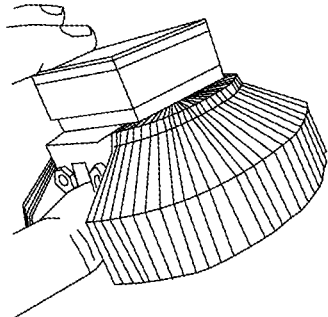
Figure 26C:
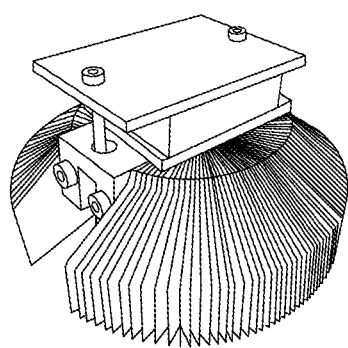
Figure 26D:
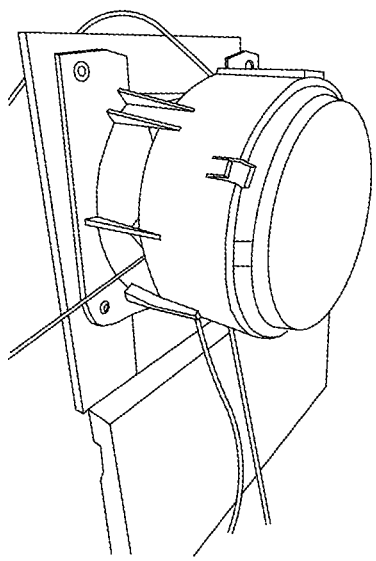

For this application we have reversed the application and attach the chiller block to the cold side of the Peltier device and cycle the ambient temperature water through the water chill block via a filter element. The results show that over 3-4 hours we can obtain 2 liters of homogenously cooled water without the need for a traditional compressor FIG. 22 shows a schematic view of a new chilled water system tank using a Peltier TE cooler, with the water tank shown removed. FIG. 23 shows a schematic view of a new chilled water system tank using a Peltier TE cooler assembled together—water flowing through filter continuously as it cycles through the chiller block. FIG. 24 shows the time taken to cool water with TE cooler for a 2 liter water tank at ambient temperature cycled through a test setup based on the circulation approach shown diagrammatically above. FIG. 25 shows a test rig full assembly with circulating pump and insulated 2 liter tank. FIGS. 26a to 26d show detail pictures of heat sink fan/blower and chiller block.

Figure 27:
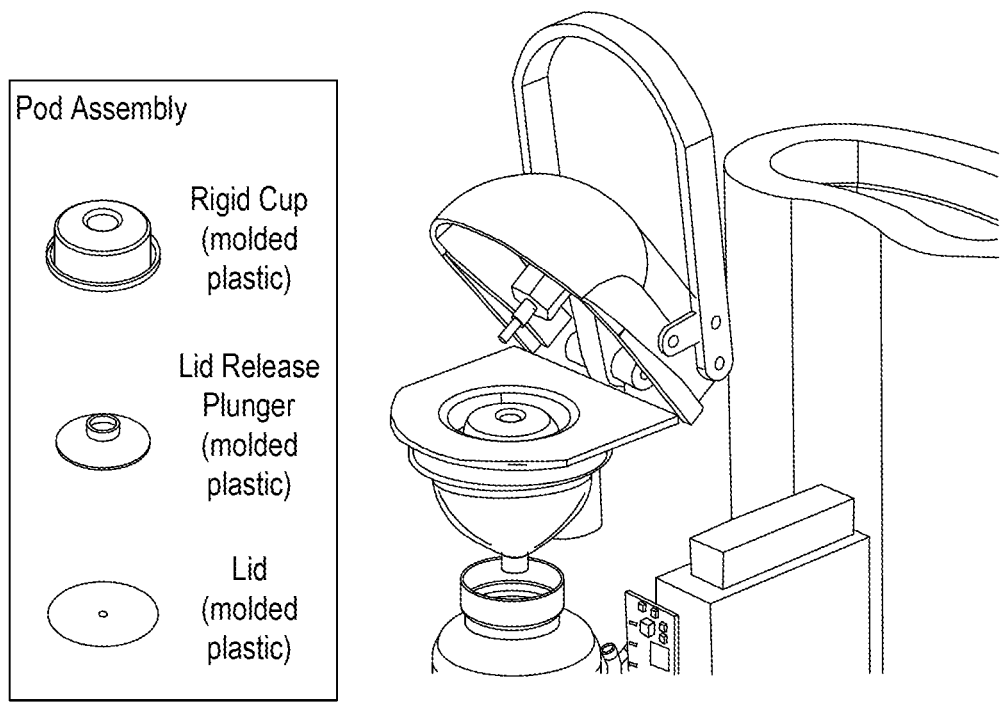
Figure 28:
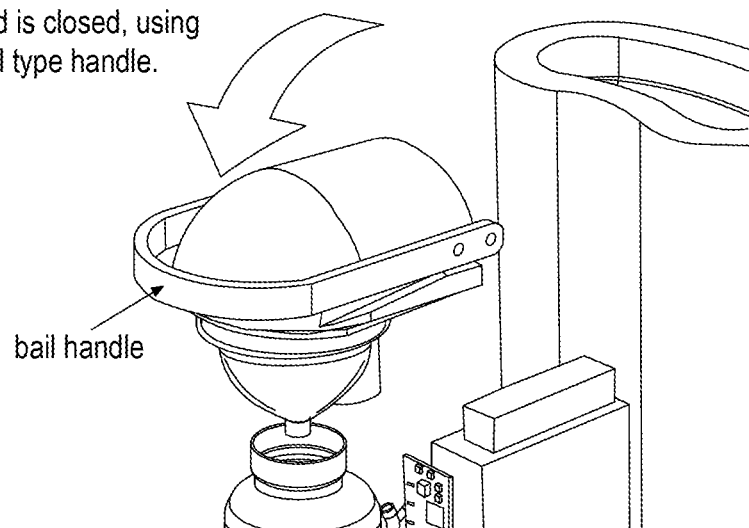

FIGS. 27 to 36 show various steps in a mix and dispense process. FIG. 27 shows a pod placed in a "brew head" of a dispenser, and also shows (inset) various components of the pod (which are also shown in FIG. 3). FIG. 28 shows the lid being closed using a bail type handle. FIG. 29 shows, after the lid is closed, a water nozzle passing through a center hole of the pod, and then motorized rotation of both pod and mixing chamber. Finally, water enters the chamber through the nozzle and adheres to the walls of the mixing chamber via centrifugal force.

FIG. 30 shows the lid being closed further to a hard stop. Further closure of the lid releases a spring force in the nozzle assembly that creates sudden downward force on the center of the cup portion of the pod. The force applied by the nozzle assembly flexes the lateral pod surfaces, causing the center shaft of the pod to be driven downward, thereby driving downward the plunger, which will break film seal on the outer rim of the pod. Powdered contents are then released into the mixing chamber. Continued rotation of the pod and mixing chamber cause the powder to collect along the vertical inner walls of the chamber.

Figure 31:
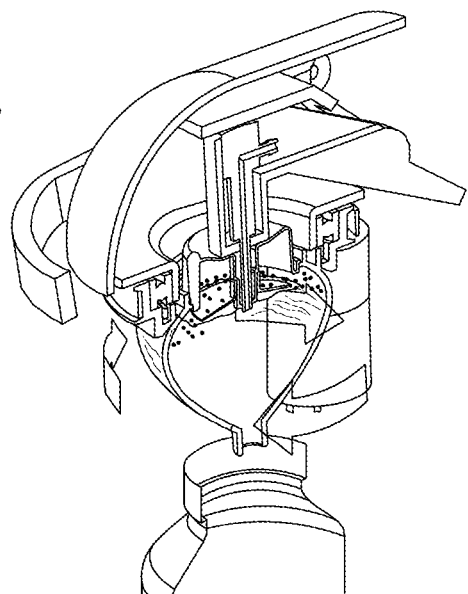
Figure 32:
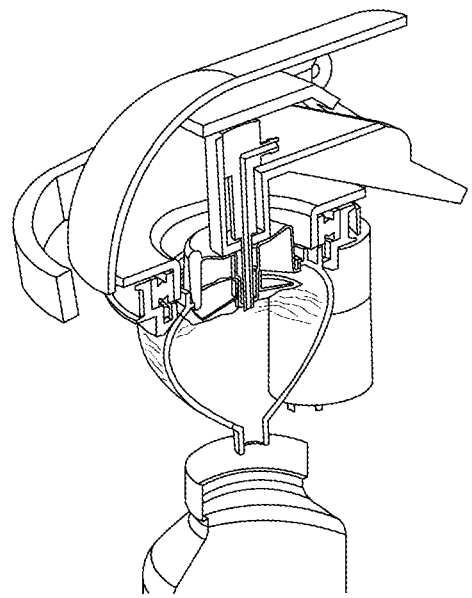
Figure 33:
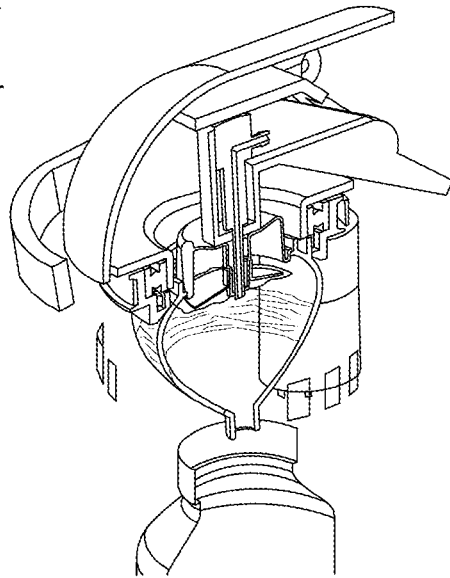
Figure 34:
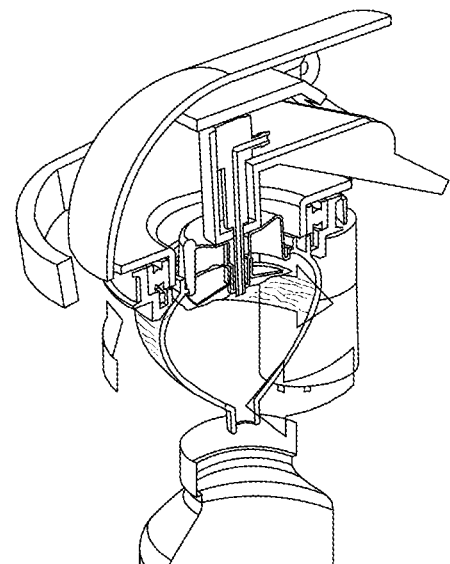

FIG. 31 shows continued rotation of the pod and mixing chamber, which causes the powder to collect along the vertical inner walls of the chamber. The water spray is stopped. FIG. 32 shows continued rotation which sends powder material into suspension. FIG. 33 shows rotation of mixing chamber being periodically slowed, in order to create turbulence for better mixing outcome. FIG. 34 shows active rotation and slowing which occurs several times, allowing far more homogenous suspension of powdered contents. In FIG. 35, active rotation and slowing occurs several times, allowing for more homogenous suspension of powdered contents. Finally, in FIG. 36, rotation of the pod and mixing chanter is ultimately stopped, allowing mixed contents to exit through the open bottom of the mixing chamber.

Benefits of the described embodiments include:

Extraction of pod contents without any dispenser components penetrating the pod interior to cut or tear the lid open.

Centrifugal start/stop action to mix powder and water as an alternative to a propeller or other physical stirring component that would need to enter the slurry to create turbulence.

The benefit of a valve-less open bottom mixing chamber, which controls the mixed contents by virtue of forces related to rotation at a high speed.

The good cleaning and maintenance potential (avoiding residue build up in mixing chamber) of a mixing chamber that has a smooth interior, with minimal physical features that would trap whetted powder. There is also a potential for a cleaning sub cycle to the dispense sequence, where a second spritz of only water is swirled in the chamber and allowed to exit to the drink container, before the dispense cycle is complete.

Specifications of certain structures and components of the present invention have been established in the process of developing and perfecting prototypes and working models. These specifications are set forth for purposes of describing an embodiment, and setting forth the best mode, but should not be construed as teaching the only possible embodiment. Rather, modifications may be made without departing from the spirit and scope of the invention as set forth in the following claims. It should be understood that all specifications, unless otherwise stated or contrary to common sense, are +1-10%, and that ranges of values set forth inherently include those values, as well as all increments between. Also it should be understood that "substantially" and the like should be construed to mean generally, but allowing for irregularities due to material or manufacturing differences, human variances, and so forth.

Embodiments described herein can be understood with reference to the following numbered clauses:

1) A system for chilling liquids including:
  A. An insulated tank;
  B. An outlet external to but in fluid communication with said water tank, said outlet configured to transport liquids from said tank;
  C. An chiller external to but in fluid communication with said tank, said chiller downstream from said outlet;
  D. An inlet external to but in fluid communication with said water tank, said inlet configured to transports liquids to said tank, said inlet downstream from said chiller.

2) The system of clause 1 wherein said insulated tank is separable from said chiller.

3) The system of clause 2 wherein said insulated tank is separable from said outlet.

4) The system of clause 2 wherein said insulated tank is separable from said inlet.

5) The system of clause 1 further comprising a pump.

The invention claimed is:

1. A dispensing apparatus for dispensing a beverage preparation ingredient from a pod, the apparatus comprising:
  a pod support region configured to support the pod;
  an actuator configured to engage with a corresponding actuator engagement region of the pod;
  a mixing chamber, the mixing chamber comprising an inlet for receiving at least one beverage preparation ingredient from said pod; and
  a rotation mechanism comprising a motor for rotating the pod about a central axis of the pod, wherein the central axis of the pod extends through the inlet;
  wherein the apparatus is configured to:
    cause an actuation member contained within the pod to cause an opening to be formed in the pod supported by the pod support region; and cause the rotation mechanism to cause the pod to rotate about the central axis of the pod during a dispensing operation, so as to cause the beverage preparation ingredient to be released from the pod into the mixing chamber via said opening.

2. A dispensing apparatus according to claim 1, further comprising a mixing device provided within the mixing chamber for mixing the at least one beverage preparation ingredient.

3. A dispensing apparatus according to claim 2, further comprising said motor coupled to the pod support region and coupled to the mixing device for actuating the mixing device, the dispensing apparatus being configured such that a mixing device engagement feature of the pod is caused to transfer rotational movement from the pod to the mixing device.

4. A dispensing apparatus according to claim 2, wherein the mixing device comprises at least one pod engagement feature for engagement with a mixing device engagement feature of the pod.

5. A dispensing apparatus according to claim 1, wherein the apparatus is configured to cause relative movement between the actuator and the pod support region, thereby causing said opening to be formed in the pod supported by the pod support region.

6. A dispensing apparatus according to claim 5, further comprising an actuator drive mechanism configured to cause said relative movement between the actuator and the pod support region, the actuator drive mechanism comprising a linkage assembly, and a prime mover configured to drive said linkage assembly.

7. A dispensing apparatus according to claim 1, wherein the actuator is configured to move in a downwards direction during a dispensing operation relative to the pod support region.

8. A dispensing apparatus according to claim 1, wherein the pod support region is fixed in position relative to the central axis of the pod in a direction parallel to the central axis of the pod.

9. A dispensing apparatus according to claim 1, having a first configuration in which the pod is supported by said pod support region and said actuator is at a first position relative to the pod support region, and a second configuration in which said actuator is at a second position relative to the pod support region, the apparatus being configured to transition from the first configuration to the second configuration during a dispensing operation.

10. A dispensing apparatus according to claim 9, wherein during a first transition from the first configuration to the second configuration, an actuator link is caused to rotate about a pivot in a first direction by a prime mover.

11. A dispensing apparatus according to claim 9, further having a third configuration in which said actuator is at a third position relative to the pod support region, the actuator being separated from the pod support region in the third configuration so as to permit the pod to be placed on the pod support region.

12. A dispensing apparatus according to claim 11, wherein during a second transition from the first configuration to the third configuration, an actuator link is caused to pivot about a pivot in a second direction, the second direction being opposite to the first direction.

13. A dispensing apparatus according to claim 12, wherein during at least a part of the second transition, the actuator link is de-coupled from a prime mover.

14. A dispensing apparatus according to claim 1, wherein the apparatus comprises:
a first liquid outlet configured to dispense liquid into the mixing chamber; and
a second liquid outlet configured to dispense liquid into a vessel configured to receive a beverage.

15. A dispensing apparatus according to claim 1, wherein the actuator comprises a pod engagement portion which is co-axial with the central axis of the pod.

16. A dispensing apparatus according to claim 15, wherein:
the pod engagement portion has a first width in a direction perpendicular to the axis at a first location and a second width in a direction perpendicular to the axis at a second location, the second width being smaller than the first width; and
the apparatus is configured to cause the second location of the pod engagement portion to be inserted into the actuator engagement portion of the pod during a dispensing operation.

17. A dispensing apparatus according to claim 1, further comprising a liquid reservoir for storing liquid to be dispensed.

18. A dispensing apparatus according to claim 1, further comprising a controller configured to control one or more parts of a dispensing operation and/or a mixing operation.

19. A dispensing apparatus for dispensing a beverage preparation ingredient from a pod, the apparatus comprising:
a pod support region configured to support the pod;
an actuator configured to engage with a corresponding actuator engagement region of the pod;
a rotation mechanism comprising a motor for rotating the pod;
a mixing chamber, the mixing chamber comprising an inlet for receiving at least one beverage preparation ingredient from said pod; and
a mixing device provided in the mixing chamber for mixing the at least one beverage preparation ingredient;
wherein said motor is coupled to the pod support region and coupled to the mixing device for actuating the mixing device;
wherein the apparatus is configured to:
cause an actuation member contained within the pod to cause an opening to be formed in the pod supported by the pod support region; and
cause the rotation mechanism to cause the pod to rotate about an axis of rotation during a dispensing operation, so as to cause the beverage preparation ingredient to be released from the pod into the mixing chamber via said opening.

* * * * *